(12) United States Patent
Yoshida

(10) Patent No.: US 6,411,648 B1
(45) Date of Patent: Jun. 25, 2002

(54) COMMUNICATION APPARATUS ENABLING COMMUNICATION ACCORDING TO ITU-T RECOMMENDATION V.34

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/033,586

(22) Filed: Mar. 3, 1998

(30) Foreign Application Priority Data

Mar. 3, 1997 (JP) .............................. 9-063831

(51) Int. Cl.$^7$ ................................................ H04L 5/16
(52) U.S. Cl. ........................ 375/220; 375/222; 370/522
(58) Field of Search ................................. 375/219, 220, 375/222, 356; 370/445, 522

(56) References Cited

U.S. PATENT DOCUMENTS

| | | | | |
|---|---|---|---|---|
| 5,025,469 A | * | 6/1991 | Bingham | ...................... 379/98 |
| 5,721,731 A | | 2/1998 | Yoshida | ........................ 370/26 |
| 5,903,602 A | * | 5/1999 | Torkkel | ...................... 375/222 |
| 6,081,510 A | * | 6/2000 | Valentine | .................... 370/252 |
| 6,236,469 B1 | * | 5/2001 | Watanabe et al. | ........... 358/434 |
| 6,314,170 B1 | * | 11/2001 | Noguchi et al. | ....... 379/100.17 |

* cited by examiner

*Primary Examiner*—Stephen Chin
*Assistant Examiner*—Dac V. Ha
(74) *Attorney, Agent, or Firm*—Fitzpatrick, Cella, Harper & Scinto

(57) ABSTRACT

According to the present invention, when a direction in which a retrain signal is to be transmitted is determined in advance in the communication procedures, and when the retrain procedures are to be performed by detection of a communication error via a control channel, the transmission/reception of the retrain signal is performed in the determined direction, so that the retrain procedures can be appropriately performed.

32 Claims, 36 Drawing Sheets

COMMUNICATION APPARATUS ENABLING COMMUNICATION ACCORDING TO ITU-T RECOMMENDATION V.34

BACKGROUND OF THE INVENTION

1. Field of the Invention

The present invention relates to a communication apparatus that enables communication, for example, in accordance with ITU-T Recommendation V.34.

2. Related Background Art

Conventionally, in the ITU-T V series of recommendations, retraining procedures are defined as a recovery operation that is to be performed for a communication error during the individual procedures.

However, while the definition for a retraining procedure via a control channel is included in, for example, the standards in the ITU-T Recommendations V.8 and V.34, it is not clear from which side a retrain signal should be transmitted when the procedure is to be actually executed. When a retrain signal is voluntarily transmitted from either side, the signals will conflict and the correct retrain procedures can not be performed.

SUMMARY OF THE INVENTION

To overcome the above problem, it is one object of the present invention to provide an improved communication apparatus.

It is another object of the present invention to appropriately perform retraining processing when communication errors occur on a control channel.

It is an additional object of the present invention to appropriately perform communication on a control channel.

The other objects of the present invention will become apparent during the course of the detailed description of the preferred embodiments, given while referring to the accompanying drawings.

DETAILED DESCRIPTION OF THE PREFERRED EMBODIMENTS

The preferred embodiments will now be described in detail while referring to the accompanying drawings.

A first embodiment of the present invention will now be explained.

In conventional facsimile communication according to the ITU-T Recommendations V.8 and V.34, a retrain signal in a control channel is defined. According to these recommendations, a retrain signal in a control channel can be dispatched by a transmitter to a receiver, or vice versa.

As a result, retrain signals will conflict with each other and the communication process can not be continued.

According to the first embodiment, a facsimile machine that can avoid the dispatch of conflicting retrain signals is provided.

Figure 1:
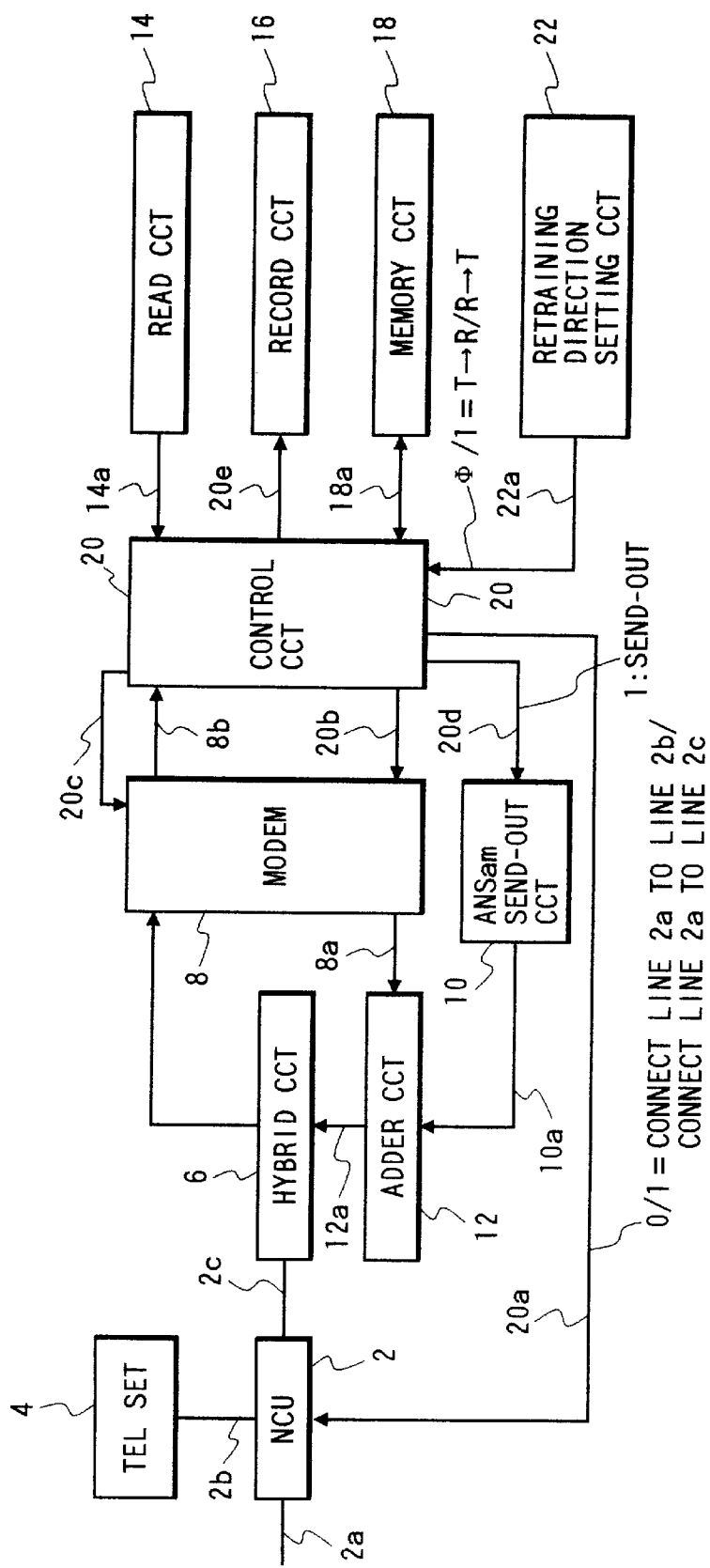
FIG. 1 is a block diagram illustrating the arrangement of a facsimile machine according to a first and fourth to sixth embodiments of the present invention.

FIG. 1 is a block diagram illustrating the arrangement of a facsimile machine according to the first embodiment of the present invention.

An NCU (Network Control Unit) 2 connects a telephone line to a terminal, controls the connection across the telephone network, selects a data communication channel and holds a loop, so as to employ a telephone network for data communication. When a signal level (signal line 20a) from a controller 20 is "0", the NCU 2 connects a telephone line 2a to a telephone set 4. When the signal level is "1", the NCU 2 connects the telephone line 2a to a facsimile machine. In the normal state, the telephone line 2a is connected to the telephone set 4.

A hybrid circuit 6 separates a transmission system signal from a reception system signal, receives a signal from an adder circuit 12 that it transmits via the NCU 2 to the telephone line 2a, and receives a signal from a partner via the NCU 2 that it transmits to a modem 8 along a signal line 6a.

The modem 8 performs modulation and demodulation in accordance with the standards defined in ITU-T Recommendations V.8, V.21, V.27ter, V.29, V.17 and V.34, and the individual transfer modes are designated across a signal line 20c. The modem 8 receives a signal via the signal line 20b and outputs modulated data to a signal line 8a, and receives a reception signal via the signal line 6a and outputs demodulated data across a signal line 8b.

An ANSam transmitting circuit 10 transmits an ANSam signal. When a signal at level "1" is output via the signal line 20d, the ANSam transmitting circuit 10 transmits an ANSam signal across a signal line 10a, but when a signal at level "0" is output across the signal line 20d, the ANSam transmitting circuit 10 does not transmit any signal.

The adder circuit 12 adds data that are received via the signal lines 8a and 10a and outputs the results across a signal line 12a. A reading circuit 14 reads a document image and outputs the image data across a signal line 14a. A recording circuit 16 sequentially records data output for each line along a signal line 20e.

A memory circuit 18 stores raw information or coded information for data that are read, or stores received information or decoded information.

A retraining direction setting circuit 22 sets a direction in which retraining is performed during communication via a control channel. When retraining from the transmitter to the receiver is selected, a signal at level "0" is output across the signal line 22a. When retraining from the receiver to the transmitter is selected, a signal at level "1" is output across the signal line 22a.

A control circuit 20 controls the facsimile communication function defined in ITU-T Recommendations V.8 and V.34. The control circuit 20 performs a pre-procedure to determine direction in which a retrain signal is to be transmitted when communicating across (or via) the control channel, and in accordance with this determination, employs the retraining as needed while the communicating across (or via) the control channel.

At the pre-procedure, whether the transmitter can transmit a retrain signal while communicating across the control channel, and whether it can receive a retrain signal from the receiver when communicating across the control channel, are transmitted to the receiver by the transmitter. Upon receipt of this notification, the receiver notifies the transmitter whether the retrain signal is transmitted to the transmitter or received from the transmitter while communicating across the control channel.

In this manner, the retrain signal dispatched while the communication is taking place across the control channel is determined to be either a transmission from the transmitter to the receiver, or a transmission from the receiver to the transmitter. The control circuit 20 is mainly responsible for performing the above processing.

FIGS. 2 to 10 are flowcharts showing the control processing performed by the control circuit 20 according to the first embodiment of the present invention.

Figure 2:
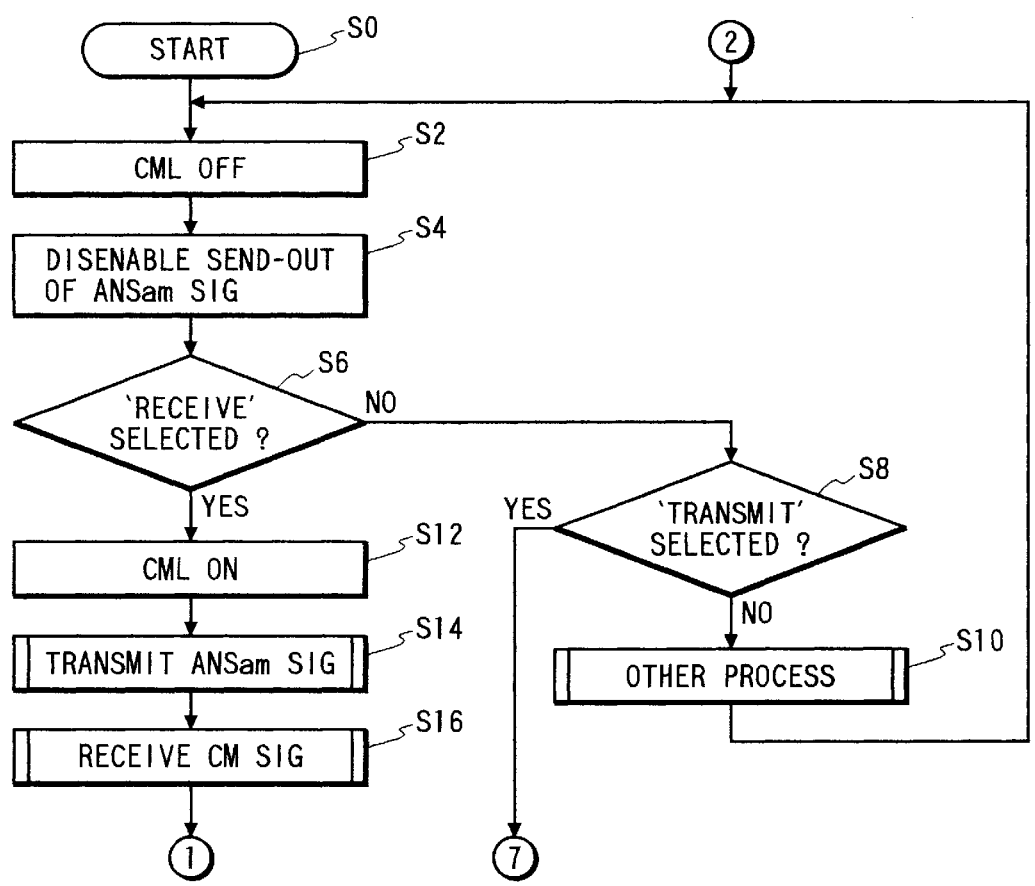
FIG. 2 is a flowchart showing the processing for the first embodiment.
Figure 3:
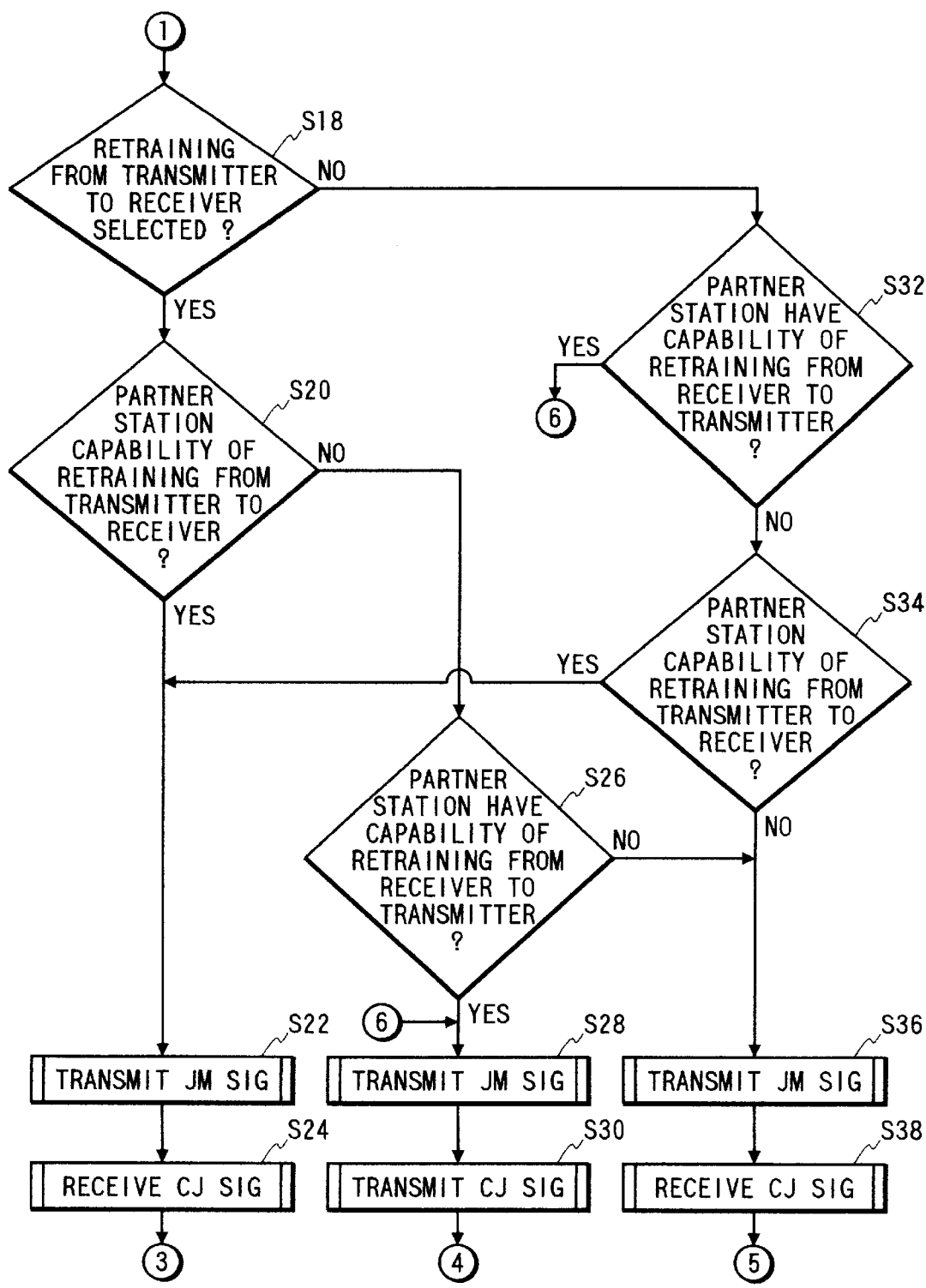
FIG. 3 is a flowchart showing the processing for the first embodiment.
Figure 4:
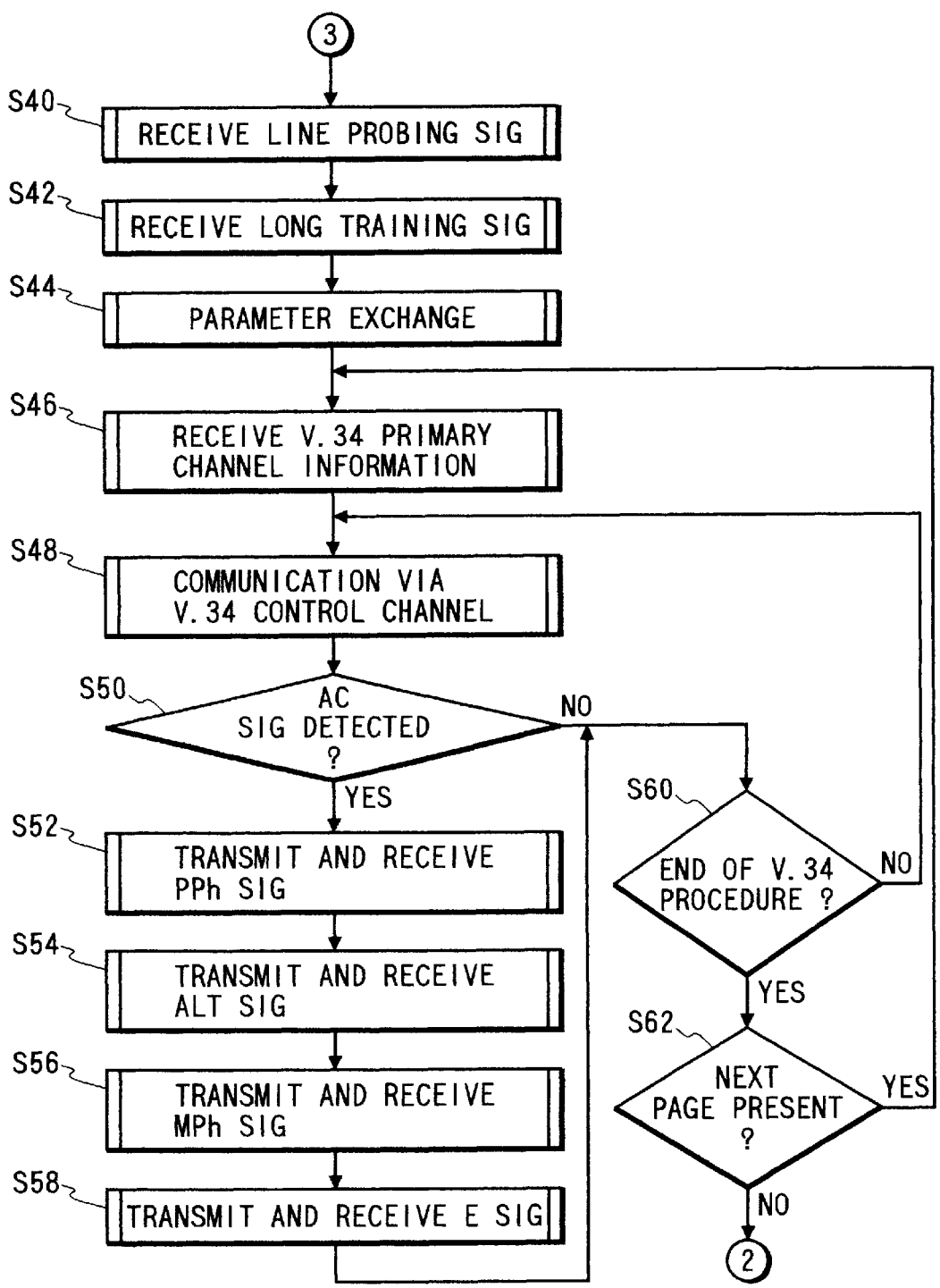
FIG. 4 is a flowchart showing the processing for the first embodiment.
Figure 5:
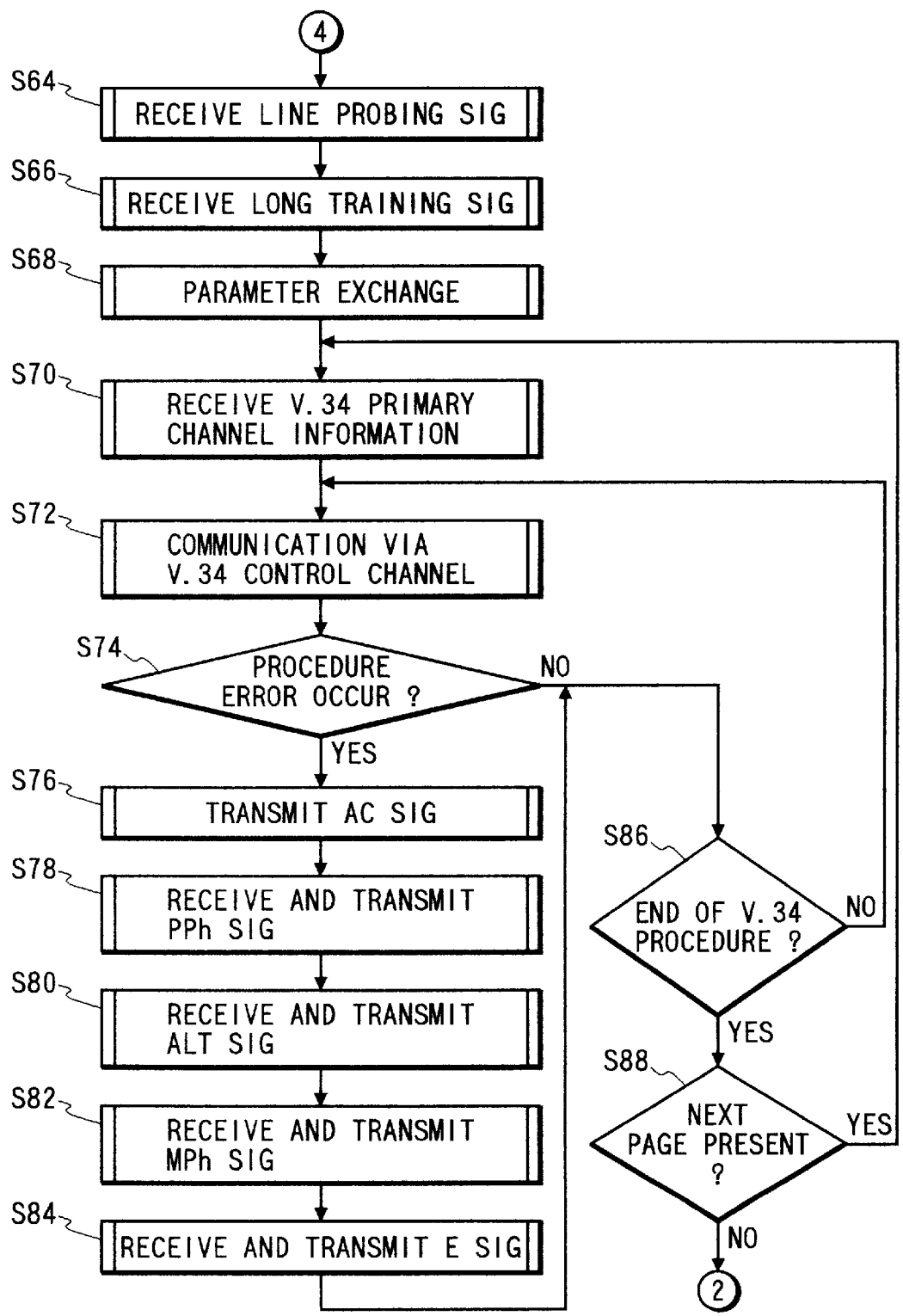
FIG. 5 is a flowchart showing the processing for the first embodiment.
Figure 6:
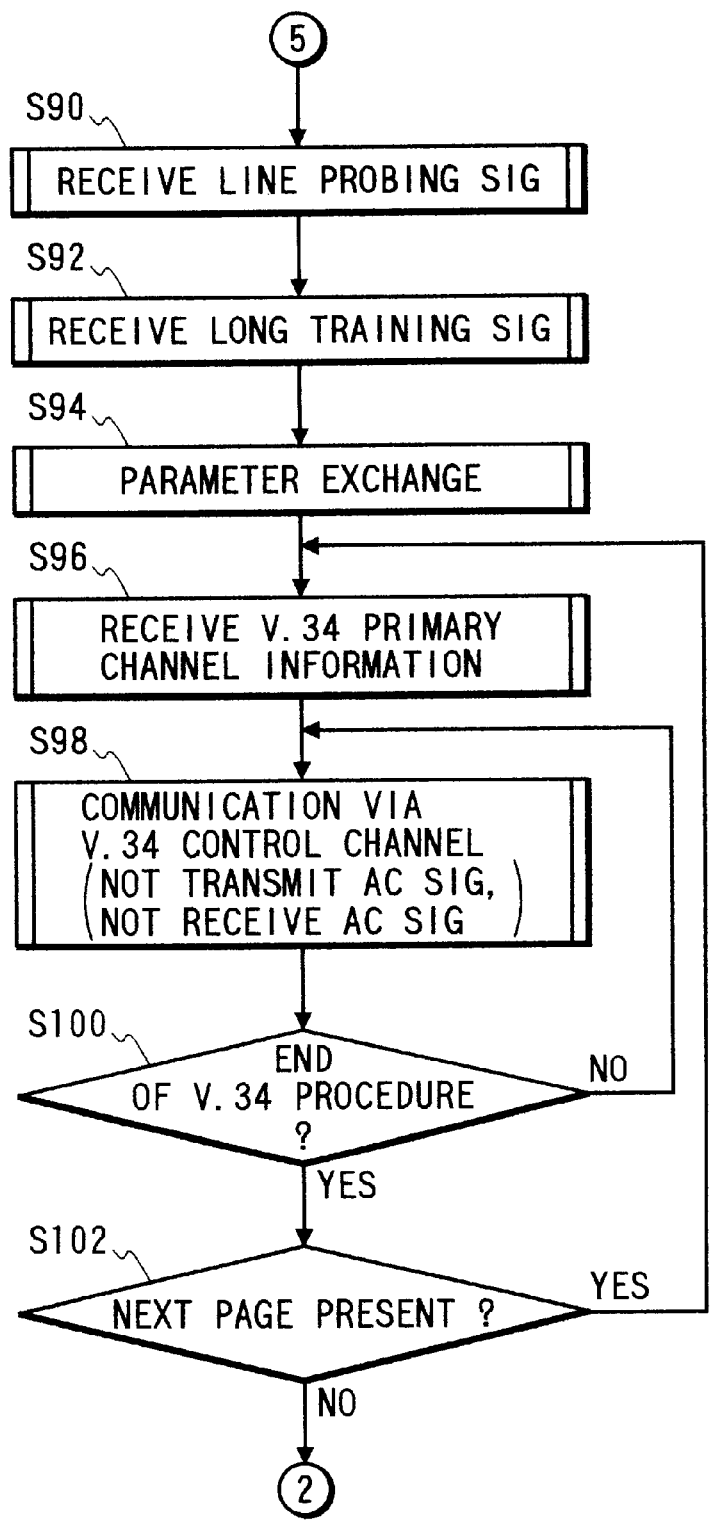
FIG. 6 is a flowchart showing the processing for the first embodiment.
Figure 7:
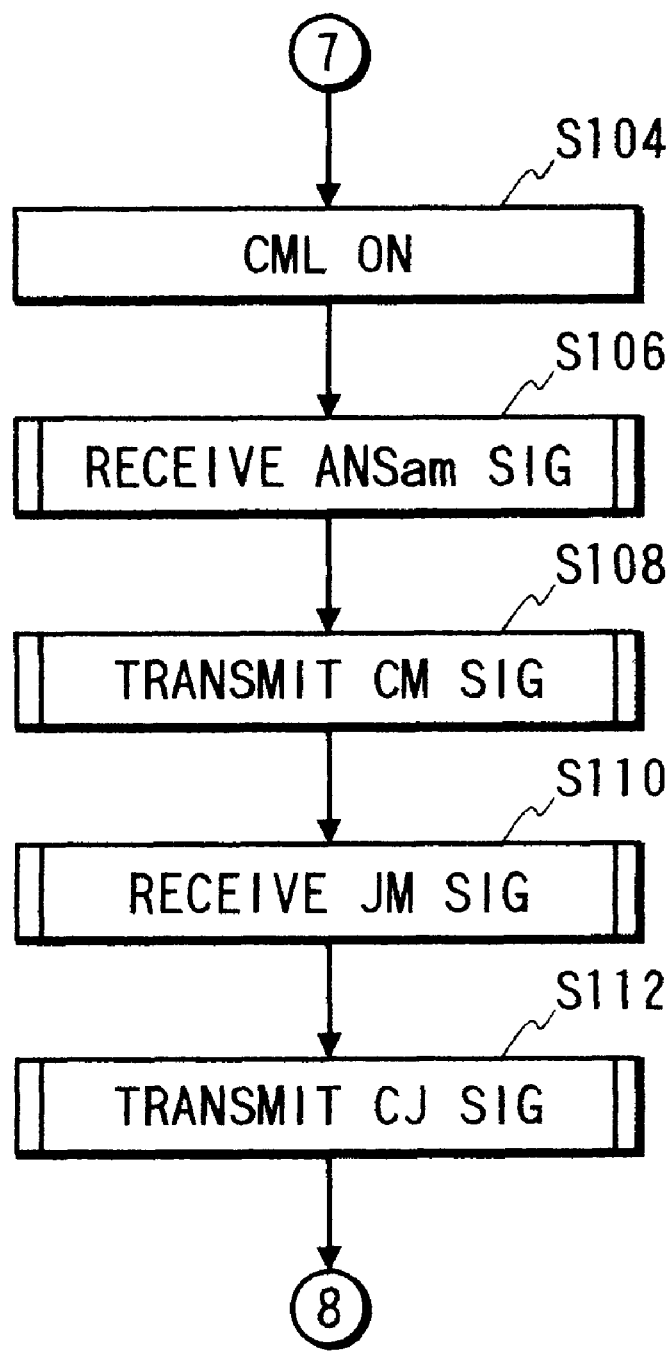
FIG. 7 is a flowchart showing the processing for the first embodiment.
Figure 8:
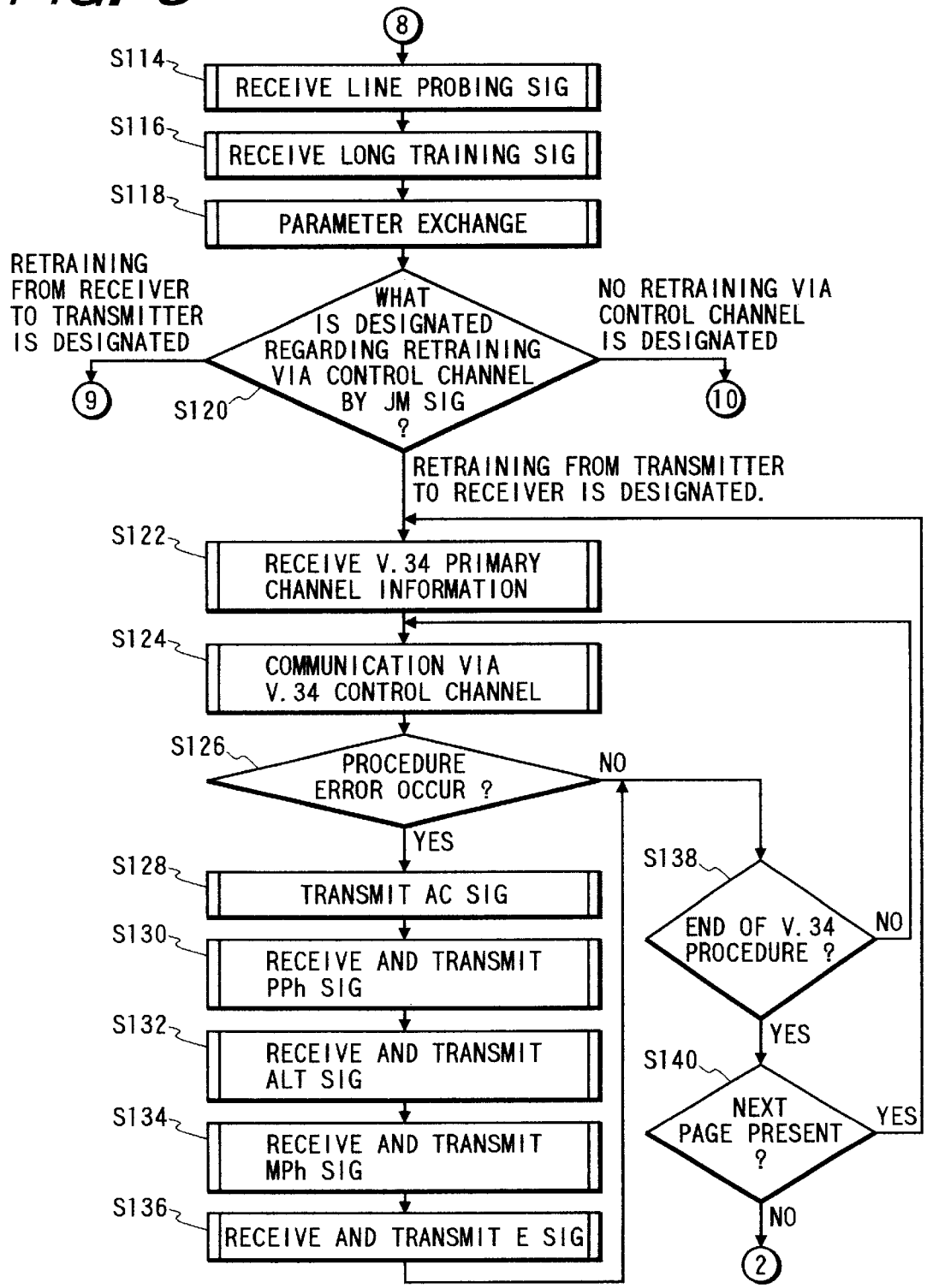
FIG. 8 is a flowchart showing the processing for the first embodiment.
Figure 9:
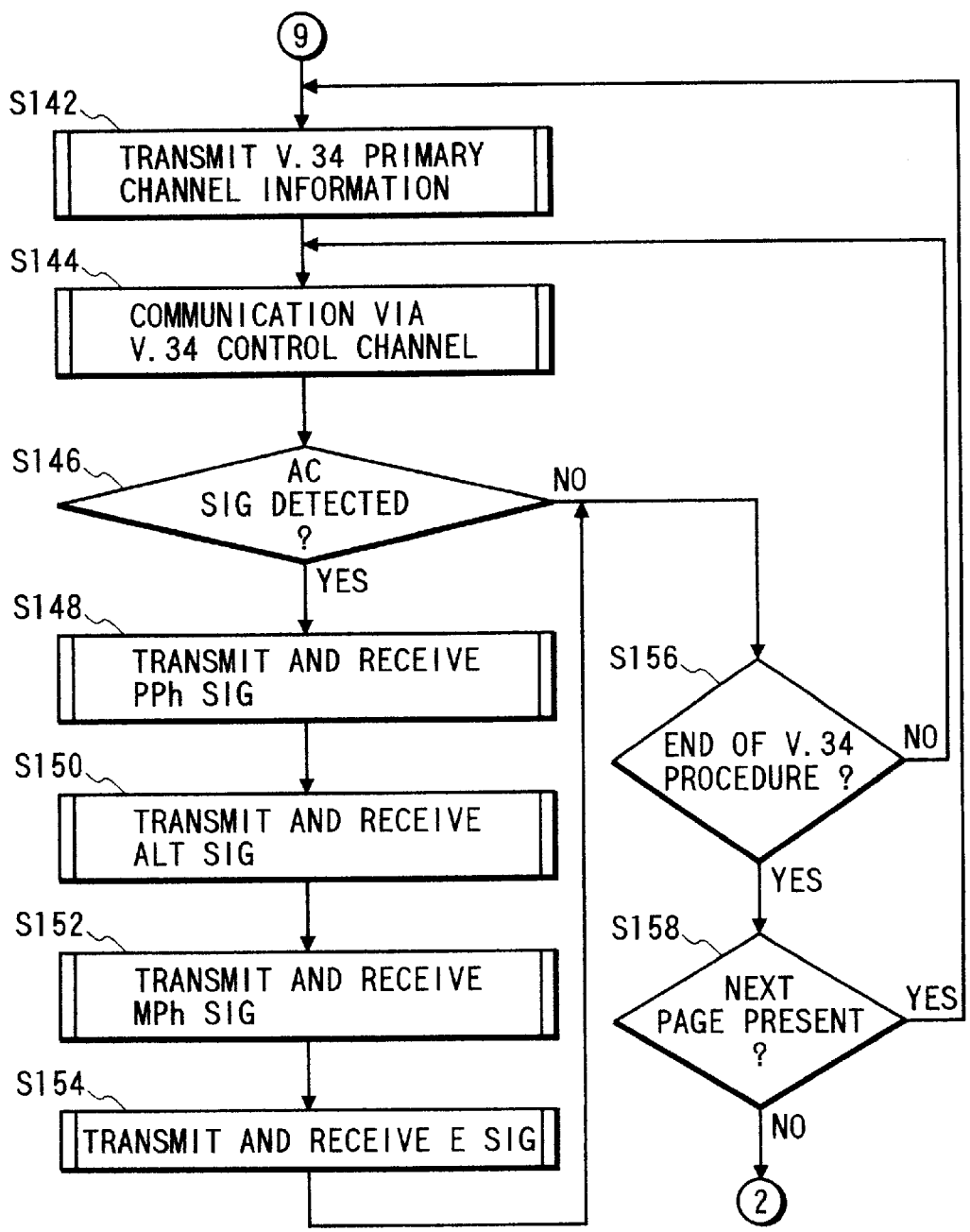
FIG. 9 is a flowchart showing the processing for the first embodiment.
Figure 10:
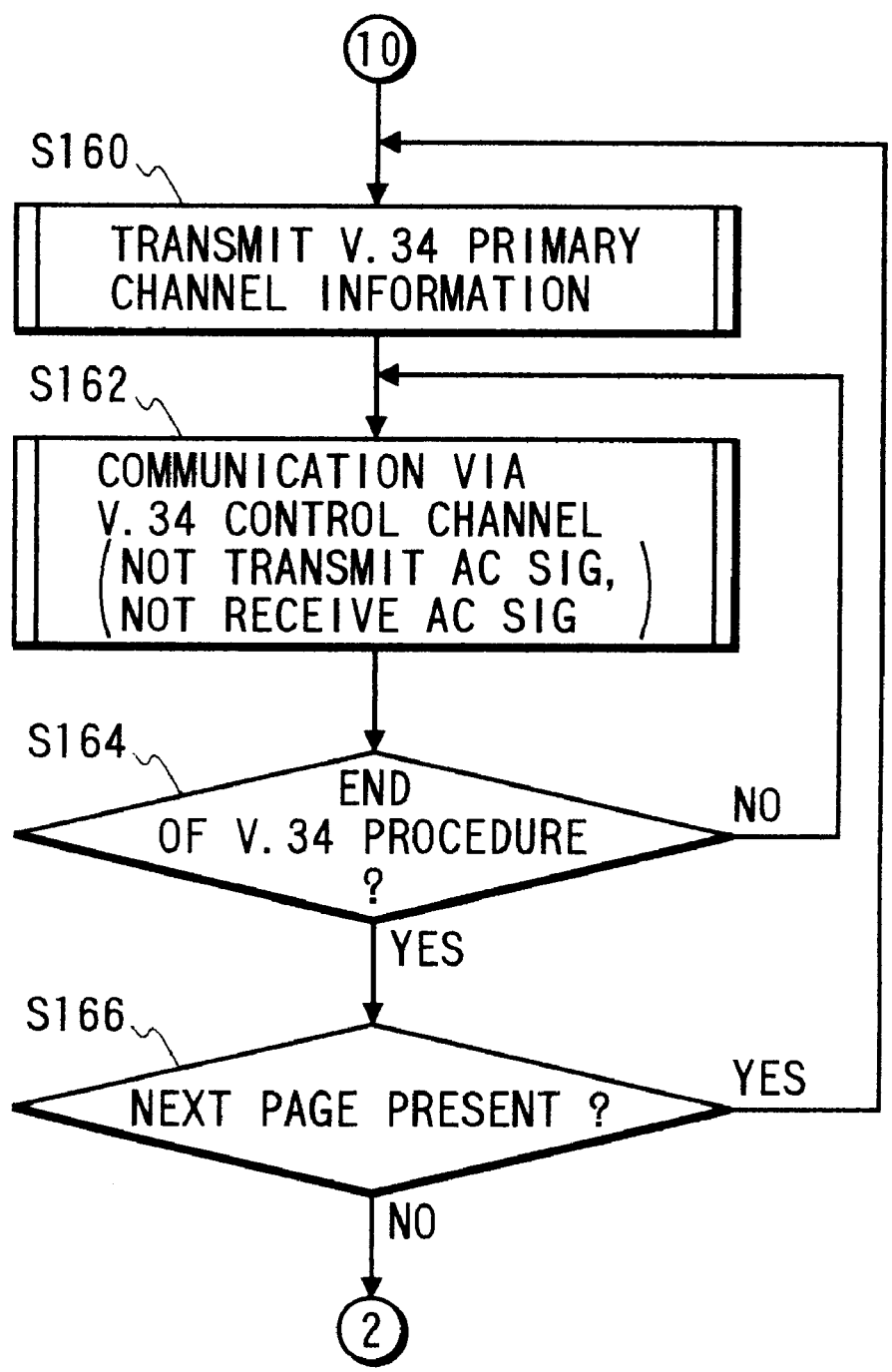
FIG. 10 is a flowchart showing the processing for the first embodiment.

In FIG. 2, the control circuit 20 is activated at step S0, and at step S2, outputs a signal at level "0" to the signal line 20a and turns off a CML. At step S4 the control circuit 20 outputs a signal at level "0" to the signal line 20d to set an ANSam signal non-transmission state.

At steps S6 and S8, checks are sequentially performed to determine whether reception or transmission is selected. When reception is selected, program control moves to step S12, and when transmission is selected, program control goes to step S104. When neither of them is selected, program control goes to step S10, whereat the other process is performed. Program control thereafter returns to step S2.

At step S12, a signal at level "1" is output to the signal line 20a and the CML is turned on. At step S14, an ANSam signal is output and at step S16 a CM signal is received. At this time, information is stored concerning whether or not the transmitter can transmit a retrain signal to the receiver while communicating across the control channel and whether or not the transmitter can receive a retrain signal from the receiver while communicating across the control channel.

At step S18, information carried on the signal line 22a is received, and a check is performed to determine whether transmission of the retrain signal from the transmitter to the receiver has been selected. When transmission of the retrain signal from the transmitter to the receiver has been selected, program control advances to step S20. When transmission from the receiver to the transmitter has been selected, program control goes to step S32.

At step S20, the information concerning the CM signal, which is received at step S16, can be employed to determine whether or not a partner's station is capable of performing the retrain process in a direction from the transmitter to the receiver. If the partner's station has that capability, program control moves to step S22; if not, program control moves to step S26.

At step S22, transmission of a JM signal is executed. With the JM signal, the retraining of the control channel from the transmitter to the receiver is designated for the partner's station. At step S24, a CJ signal is received and program control advances to step S40.

At step S26, the information concerning the CM signal, which is received at step S16, can be employed to determine whether or not a partner's station is capable of performing the retrain process in a direction from the receiver to the transmitter. If the partner's station has that capability, program control advances to step S28; if not, program control moves to step S36.

At step S28, transmission of a JM signal is executed. With the JM signal, transmission of the retrain signal across the control channel from the transmitter to the receiver is designated for the partner's station. At step S30, a CJ signal is received and program control advances to step S64.

At step S32, the information concerning the CM signal, which is received at step S16, can be employed to determine whether or not the partner's station is capable of performing the retrain process in a direction from the receiver to the transmitter. If the partner's station has that capability, program control advances to step S28; if not, program control moves to step S34.

At step S34, the information concerning the CM signal, which is received at step S16, can be employed to determine whether or not the partner's station is capable of performing the retrain process in a direction from the transmitter to the receiver. If the partner's station has that capability, program control advances to step S22; if not, program control moves to step S36.

At step S36, transmission of a JM signal is executed. With the JM signal, the transmission of the retrain signal across the control channel from the transmitter to the receiver is designated for the partner's station. At step S38, a CJ signal is received and program control advances to step S90.

The reception of a line probing signal at step S40, the reception of a long training signal at step S42, the exchange of parameters at step S44, the reception of primary channel data at step S46, and the initiation of communication across a V.34 control channel at step S48 are performed.

At step S50, a check is performed to determine whether an AC signal has been detected, i.e., whether a retrain signal across the control channel is detected. When an AC signal is detected, program control advances to step S52. If an AC signal has not been detected, program control moves to step S60.

Transmission and reception of a PPh signal at step S52, transmission and reception of an ALT signal at step S54, transmission and reception of an MPh signal at step S56, and transmission and reception of an E signal at step S58 are performed.

At step S60, a check is performed to determine whether the procedures conforming to V.34 have been completed. When the procedures have been terminated, program control moves to step S62, and when they have not yet been completed, program control moves to step S48.

At step S62, a check is performed to determine whether there is a subsequent page. If there is a subsequent page, program control advances to step S46, and if there are no more pages, program control moves to step S2.

The reception of a line probing signal at step S64, the reception of a long training signal at step S66, and the communication across V.34 control channel at step S72 are performed.

At step S74, a check is performed to determine whether a procedure error has occurred during communication through the control channel. When a procedure error has occurred, program control moves to step S76, and when no error has occurred, program control goes to step S86.

At step S76, transmission of an AC signal is executed to execute retraining across the control channel. Then, reception and transmission of an ALT signal at step S80, reception and transmission of an MPh signal at step S82, and reception and transmission of an E signal at step S84 are performed.

At step S86, a check is performed to determine whether the processing defined in V.34 has been terminated. When the processing has been terminated, program control moves to step S88. When the processing has not yet been terminated, program control goes to step S72. At step S88, a check is performed to determine whether there is a subsequent page. If there is a subsequent page, program control returns to step S70, and if not, program control returns to step S2.

The reception of a line probing signal at step S90, the reception of a long training signal at step S92, and the exchange of parameters at step S94, and the reception of V.34 primary channel information at step S96 are performed.

At step S98, communication across the V.34 control channel is performed. An AC signal is neither transmitted nor received, i.e., the retraining across the control channel is not performed.

Following this, at step S100 a check is performed to determine whether the procedure defined in V.34 has been terminated. If the procedure defined in V.34 has been terminated, program control advances to step S102. If the procedure has not yet been terminated, program control returns to step S98. At step S102, a check is performed to determine whether there is a subsequent page. If there is a subsequent page, program control returns to step S96, and if not, program control returns to step S2.

At step S104, a signal at level "1" is output along the signal line 20a to turn on the CML. At step S106, an ANSam signal is received.

At step S108, transmission of a CM signal is executed. At this time, information is transmitted concerning whether the transmitter can transmit a retrain signal while communicating across the control channel and whether the transmitter can receive a retrain signal from the receiver while communicating across the control channel (for example, information indicating that both capabilities exist).

At step S110, a JM signal is received, and the retraining information in a control channel designated by the partner's station is stored.

Following this, the transmission of a CJ signal at step S112, the transmission of a line probing signal at step S114, the transmission of a long training signal at step S116 and the exchange of parameters at step S118 are sequentially performed.

At step S120, the retraining signal transmitted across the control channel designated by the JM signal is examined. When the performance of the retrain process from the transmitter to the receiver is selected, program control advances to step S122. When the performance of the retrain process from the receiver to the transmitter is selected, program control moves to step S142. When the performance of the retrain process across the control channel is not selected, program control goes to step S160.

At step S122, V.34 primary channel information is transmitted, and at step S124, communication across the control channel is executed.

At step S126, a check is performed to determine whether a procedure error has occurred while communication across the control channel is in progress. When a procedure error has occurred, program control advances to step S128. When a procedure error has not occurred, program control moves to step S138.

At step S128, an AC signal is transmitted to perform retraining across the control channel. The reception and transmission of a PPh signal at step S130, the reception and transmission of an ALT signal at step S132, the reception and transmission of an MPh signal at step S134, and the reception and transmission of an E signal at step S136 are performed.

At step S138, a check is performed to determine whether the procedure defined in V.34 has been terminated. If the procedure defined in V.34 has been terminated, program control advances to step S140. If the procedure has not yet been terminated, program control returns to step S124. At step S140, a check is performed to determine whether there is a subsequent page. If there is a subsequent page, program control returns to step S122; if not, program control returns to step S2.

At step S142, V.34 primary channel information is transmitted, and at step S144, communication across the control channel is executed.

At step S146, a check is performed to determine whether an AC signal has been detected, i.e., whether transmission of a retrain signal across the control channel has been detected. When an AC signal has been detected, program control advances to step S148, and when an AC signal has not been detected, program control moves to step S156.

Following this, the transmission and reception of a PPh signal at step S148, the transmission and reception of an ALT signal at step S150, the transmission and reception of an MPh signal at step S152, and the transmission and reception of an E signal at step S154 are sequentially performed.

At step S156, a check is performed to determine whether the procedure defined in V.34 has been terminated. If the procedure defined in V.34 has been terminated, program control advances to step S156. If the procedure has not yet been terminated, program control returns to step S144. At step S158, a check is performed to determine whether there is a subsequent page. If there is a subsequent page, program control returns to step S142; if not, program control returns to step S2.

At step S160, V.34 primary channel information is transmitted, and at step S162, communication across the control channel is executed. An AC signal is neither transmitted nor received, i.e., the retraining process is not performed across the control channel.

At step S164, a check is performed to determine whether the procedure defined in V.34 has been terminated. If the procedure defined in V.34 has been terminated, program control advances to step S166. If the procedure has not yet been terminated, program control returns to step S162. At step S166, a check is performed to determine whether there is a subsequent page. If there is a subsequent page, program control returns to step S160; if not, program control returns to step S2.

A second embodiment for the present invention will now be described.

For the above described facsimile machine that can perform communication according to ITU-T Recommendations V.8 and V.34, as V.34 control channel signals there are signals PPh, ALT, MPh, Sh, Sh*, E, etc. Signal Sh* is a phase-inverted Sh signal, and in the drawings is presented by an Sh.

Conventionally, the baud rate for the signals PPh, Sh, Sh* and E are fixed, and while an ALT signal from the reception modem ranges from 16 baud to 120 baud, 16 baud is selected as the fixed value in order to effect a reduction in communication time.

However, the recovery procedures for individual information transmitted across a V.34 control channel are not defined in the current ITU-T Recommendation, and it is presumed that the receipt by a partner's station a signal transmitted by a concerned station is ensured.

Retraining using an AC signal is determined as constituting a recovery performed via the entire V.34 control channel. However, since there is no recovery procedure for individually transmitted information, according to the current Recommendation the performance via the V.34 control channel must be ensured, otherwise a problem with communication occurs on the V.34 control channel and a transfer across a fast primary channel can not be effectively performed.

In the second embodiment of the present invention, therefore, provided is a facsimile machine that can appropriately control the baud rate for an ALT signal transmitted by a reception modem, that can give priority to high speed communication when a reception level is high, and give priority to communication certainty when a reception level is low, and that can provide an improved communication success rate via a V.34 control channel. According to a third embodiment of the present invention, provided is a facsimile machine that changes a detection condition at a reception side via the V.34 control channel so as to provide an improved communication success rate, even when the reception level is low.

Figure 11:
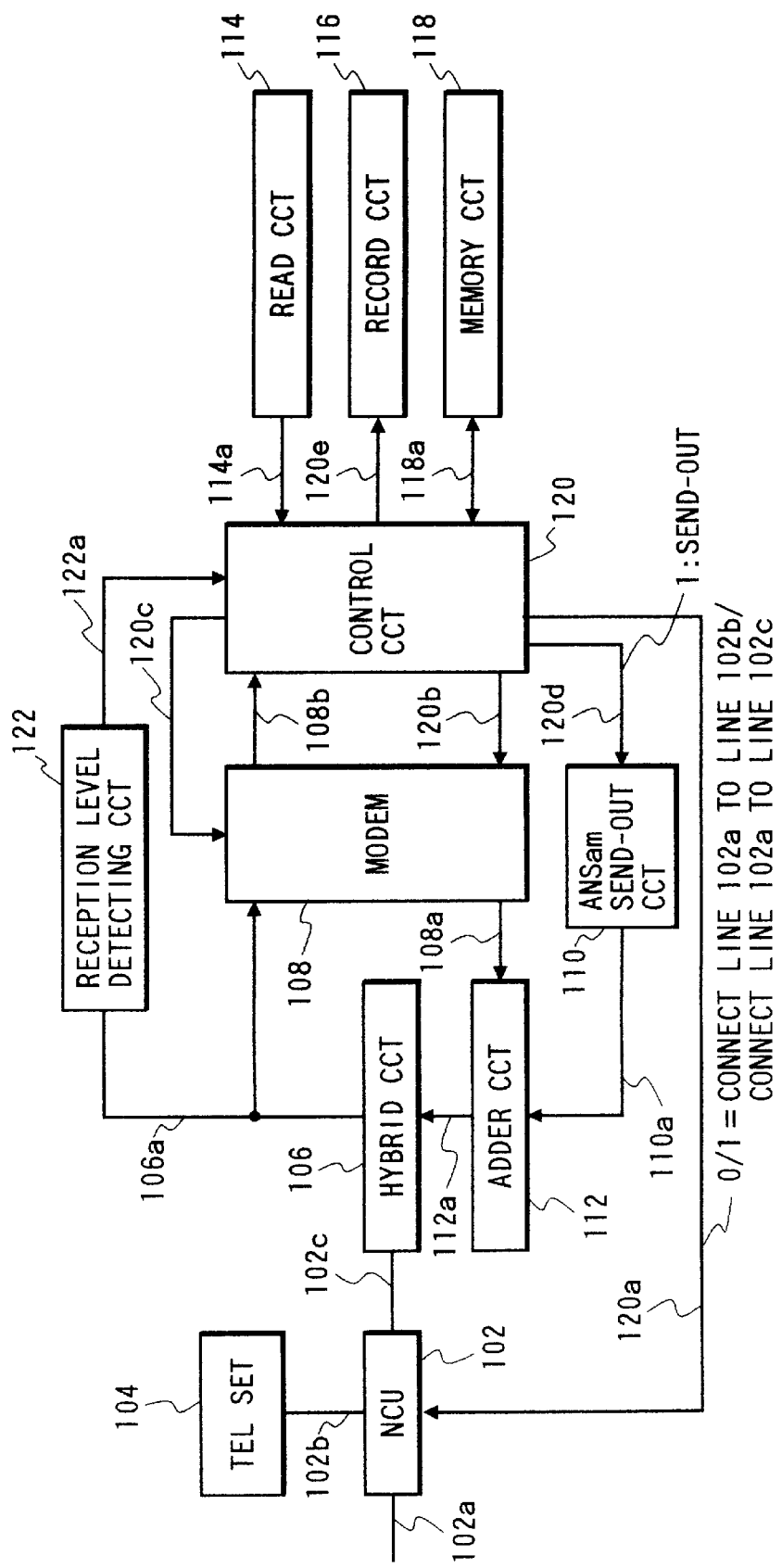
FIG. 11 is a block diagram illustrating the arrangement of a facsimile machine according to a second and third embodiments of the present invention.

FIG. 11 is a block diagram illustrating a facsimile machine according to the second and the third embodiment of the present invention.

An NCU (Network Control Unit) 102 connects a telephone line to a terminal, controls the connection across the telephone network, selects a data communication channel, and holds a loop, so as to employ a telephone network for data communication. When a signal level (signal line 120a) from a controller 120 is "0", the NCU 102 connects a telephone line 102a to a telephone set 104. When the signal level is "1", the NCU 102 connects the telephone line 102a to a facsimile machine. In the normal state, the telephone line 102a is connected to the telephone set 104.

A hybrid circuit 106 separates a transmission system signal from a reception system signal, receives a signal from an adder circuit 112 and transmits it via the NCU 102 to the telephone line 102a, and receives a signal from a partner via the NCU 102 and transmits it to a modem 108 along a signal line 106a.

The modem 108 performs modulation and demodulation in accordance with the standards defined in ITU-T Recommendations V.8, V.21, V.27ter, V.29, V.17 and V.34, and the individual transfer modes are designated across a signal line 120c. The modem 108 receives a signal from the signal line 120b and outputs modulated data to a signal line 108a, and receives a reception signal from the signal line 106a and outputs demodulated data to a signal line 108b.

An ANSam transmitting circuit 110 transmits an ANSam signal. When a signal at level "1" is output to the signal line 120d, the ANSam transmitting circuit 110 transmits an ANSam signal across a signal line 110a, but when a signal at level "0" is output to the signal line 120d, the ANSam transmitting circuit 110 does not transmit any signal.

The adder circuit 112 adds data that are received via the signal lines 108a and 110a and outputs the results across a signal line 112a. A reading circuit 114 reads a document image and outputs the image data across a signal line 114a. A recording circuit 116 sequentially records data output for each line along a signal line 120e.

A memory circuit 118 stores raw information or coded information for data that are read, or stores received information or decoded information.

A reception level detection circuit 122 receives information via the signal line 106a and outputs a current reception level across a signal line 122a.

A control circuit 120 controls the facsimile communication function defined in ITU-T Recommendations V.8 and V.34, especially in the second embodiment. Based on the reception level detected by the reception level detection circuit 122, the control circuit 120 changes the baud rate when an ALT signal originating at the reception modem is to be transmitted across the V.34 control channel. When the reception level is low, the baud rate is increased for the transmission across the V.34 control channel of an ALT signal originating at the reception modem. When the reception level is high, the baud rate is decreased for the transmission across the V.34 control channel of an ALT signal originating at the reception modem.

Figure 12:
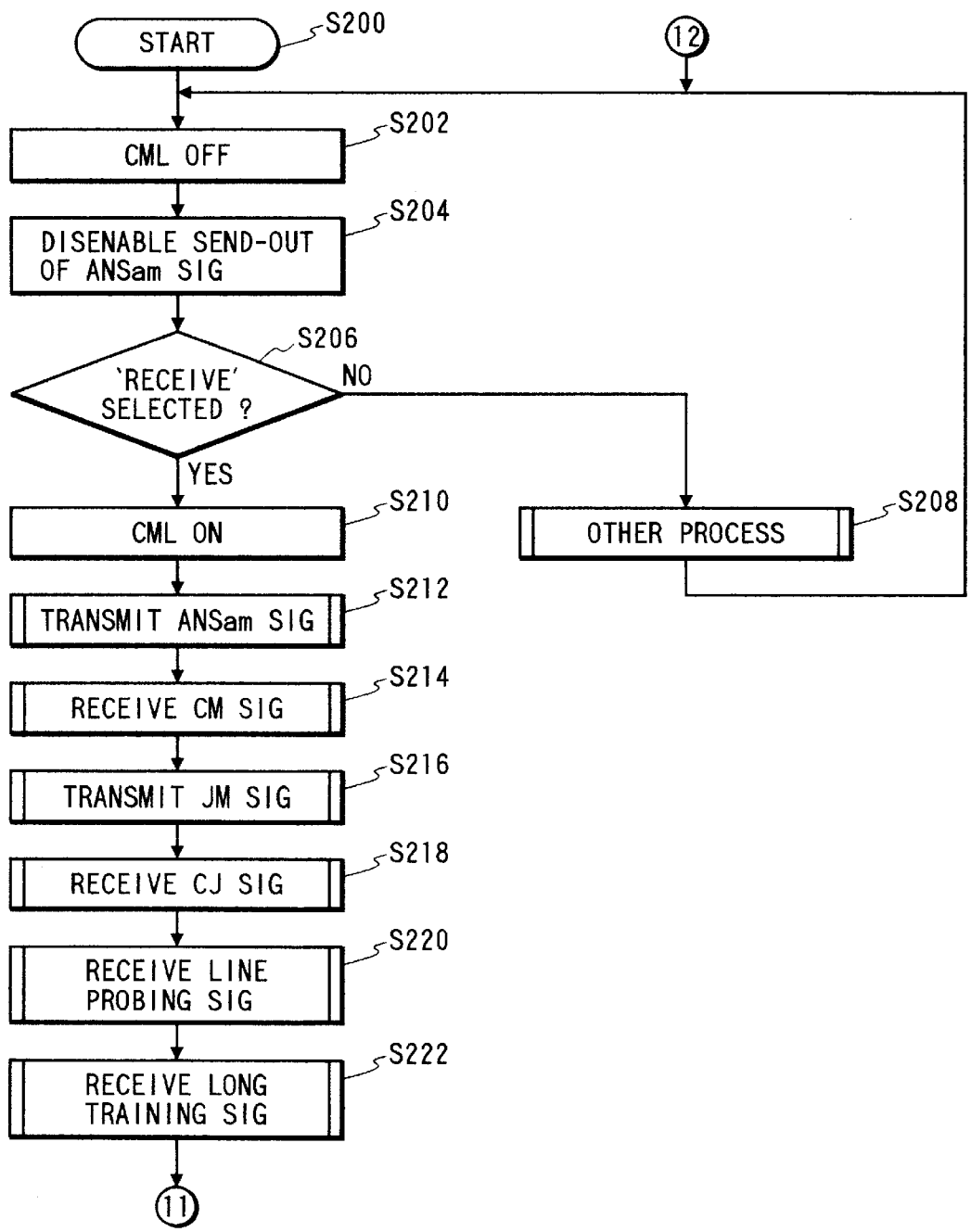
FIG. 12 is a flowchart showing the processing for the second embodiment.
Figure 13:
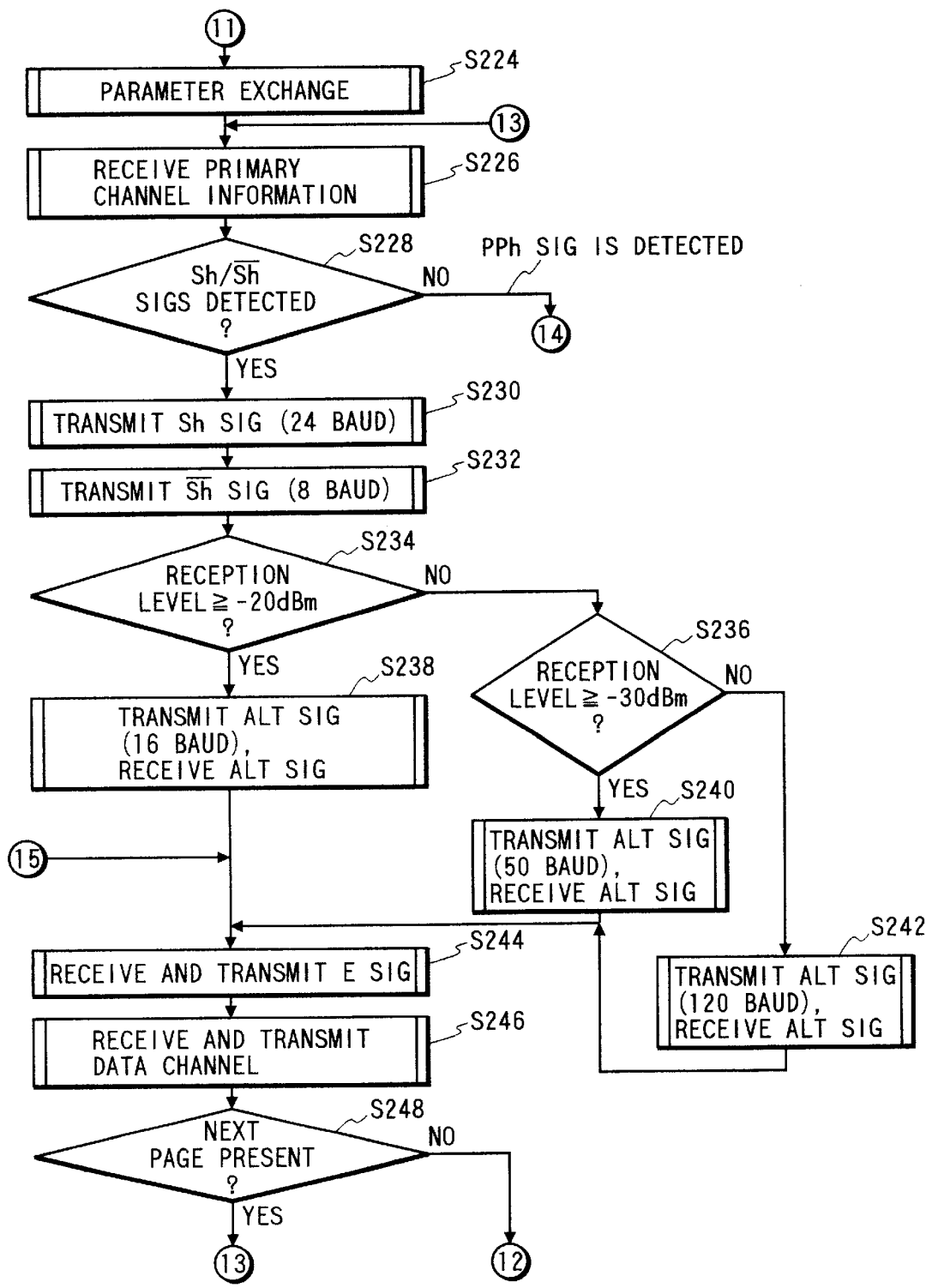
FIG. 13 is a flowchart showing the processing for the second embodiment.
Figure 14:
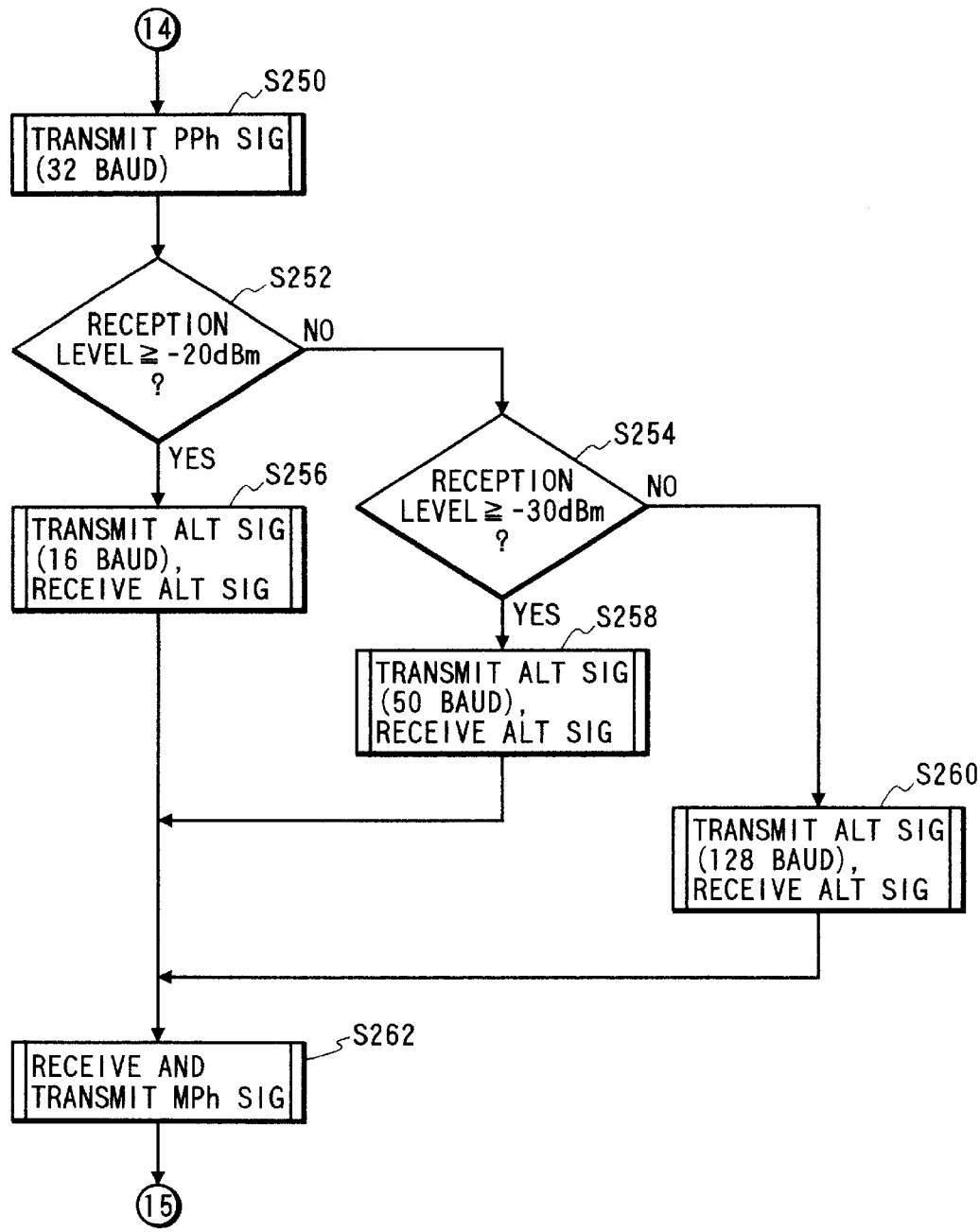
FIG. 14 is a flowchart showing the processing for the second embodiment.

FIGS. 12 to 14 are flowcharts showing the control processing performed by the control circuit 120 in the second embodiment.

In FIG. 12, the control circuit 120 is activated at step S200, and at step S202, it outputs a signal at level "0" across the signal line 120a and turns off a CML. At step S204, the control circuit 120 outputs a signal at level "0" across the signal line 120d to set an ANSam signal no-transmission state.

At step S206, a check is sequentially performed to determine whether reception has been selected. When reception has been selected, program control moves to step S210, and when reception has not been selected, program control goes to step S208 and the other process is performed. Program control thereafter moves to step S202.

At step S210, a signal at level "1" is output across the signal line 120a and the CML is turned on. Then, the transmission of an ANSam signal at step S212, reception of a CM signal at step S214, the transmission of a JM signal at step S216, and the reception of a CJ signal at step S218 are sequentially performed.

Following this, the reception of a line probing signal at step S220 and the reception of a long training signal at step S222 are performed. At this time, information transmitted across the signal line 122a is received and the reception level is stored.

Sequentially, the exchange of parameters at step S224, the reception of primary channel information at step S226, and the initiation of communication via the V.34 control channel at step S228 are performed. When Sh and Sh* signals are detected, program control moves to step S230. When a PPh signal is detected, program control goes to step S250.

At steps S234 and S236, the reception level stored at step S222 is examined. If the reception level is equal to or higher than −20 dBm, program control advances to step S238. If the reception level is equal to or higher than −30 dBm and is less than −20 dBm, program control moves to step S240. If the reception level is less than −30 dBm, program control goes to step S242.

The transmission and reception of an ALT signal (16 baud) at step S238, the transmission and reception of an ALT signal (50 baud) at step S240 or the transmission and reception of an ALT signal (120 baud) at step S242 is performed.

At step S244, the reception and transmission of an E signal are performed, and at step S248, a check is performed to determine whether there is a subsequent page. If there is a subsequent page, program control returns to step. S226; if there are no more pages, program control returns to step S202.

At step S250, a PPh signal (32 baud) is transmitted, and at steps S252 and S254, the reception level stored at step S222 is examined. If the reception level is equal to or higher than −20 dBm, program control advances to step S256. If the reception level is equal to or higher than −30 dBm and less than −20 dBm, program control moves to step S258. If the reception level is less than −30 dBm, program control goes to step S260.

The transmission and reception of an ALT signal (16 baud) at step S256, the transmission and reception of an ALT signal (50 baud) at step S258 or the transmission and reception of an ALT signal (120 baud) at step S260 is performed. At step S262, the reception and transmission of an MPh signal is performed, and program control returns to step S244.

The third embodiment of the present invention will now be described.

In the third embodiment, in FIG. 11, based on the reception level detected by the reception level detection circuit 122, the control circuit 120 changes the baud rate for the transmission of signals Sh, Sh* and PPh via the V.34 control channel, the number of MPh the signals in the V.34 control channel, and the bit count for an E signal is the V.34 control channel.

When a signal is received via the V.34 control channel, in accordance with the reception level, the control circuit 120 changes the number of the signals the detection of which is ascertained. Specifically, when the reception level is low, the number of the signals in the V.34 control channel, the detection of which is ascertained, is reduced. When the reception level is high, the number of the signals in the V.34 control channel, the detection of which is ascertained, is increased.

Figure 15:
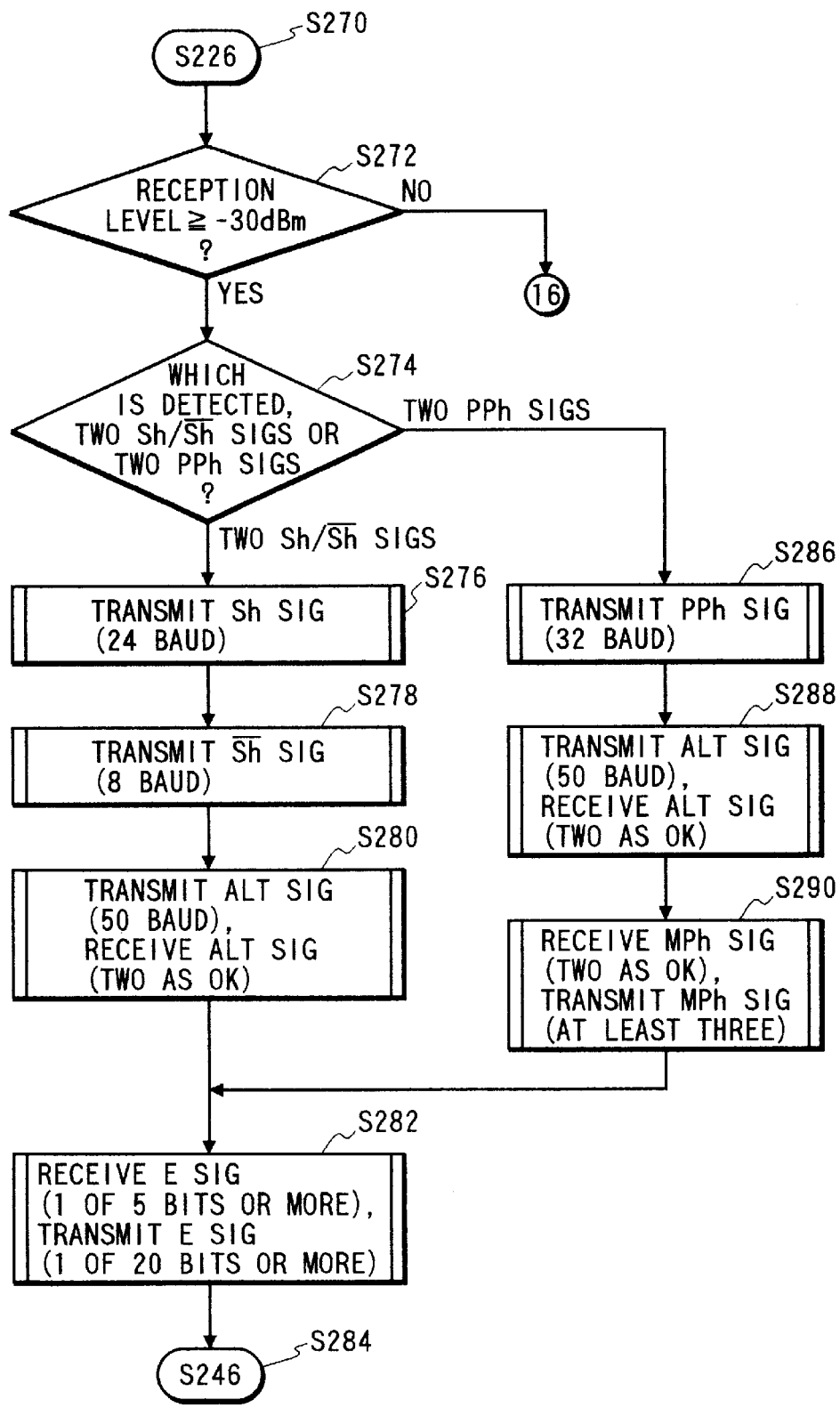
FIG. 15 is a flowchart showing the processing for the third embodiment.
Figure 16:
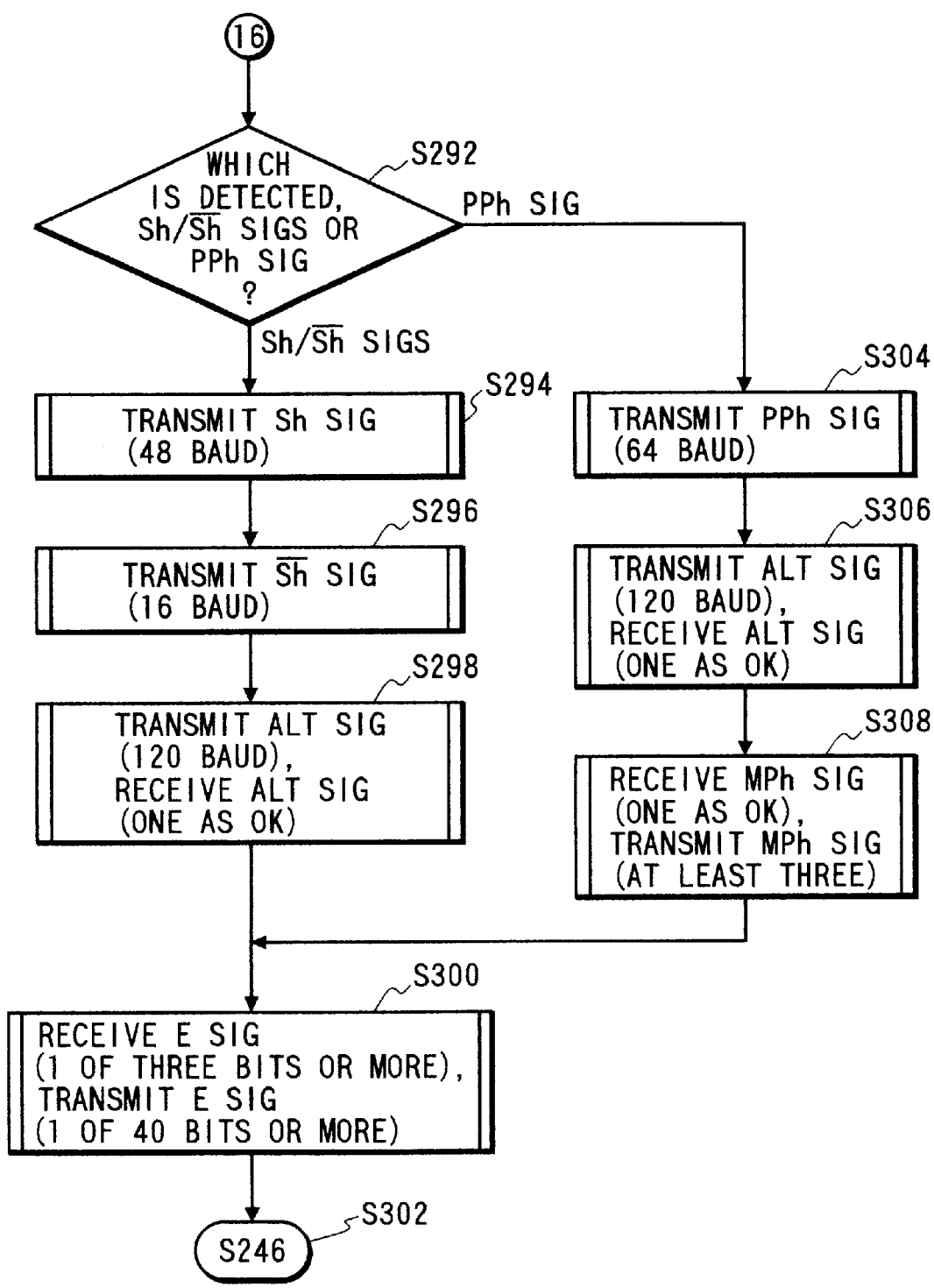
FIG. 16 is a flowchart showing the processing for the third embodiment.

FIGS. 15 and 16 are flowcharts showing the control exercised by the control circuit 120 in the third embodiment, and only those portions that differ from the portions in the second embodiment (FIGS. 12 to 14) are shown.

In FIG. 15, step S270 corresponds to step S226. At step S272, a signal transmitted across the signal line 122a is received, and a check is performed to determine whether the reception level is equal to or higher than −30 dBm. If the reception level is equal to or higher than −30 dBm, program control advances to step S274, and if the reception level is less than −30 dBm, program control moves to step S292.

At step S274, a check is performed to determine whether two sets of signals Sh and Sh* are detected, or two PPh signals are detected. When two sets of Sh and Sh* signals are detected, program control advances to step S276. When two PPh signals are detected, program control moves to step S286.

At step S276, Sh signal (24 baud) is transmitted, at step S278, Sh* signal (8 baud) is transmitted, and at step S280 an ALT signal (50 baud) is transmitted. At the same time, the reception of ALT signals is executed, and when two ALT signals have been received, an acceptable reception is established.

At step S282, reception of an E signal is excuted, and when "1"s of five bits or more have been received, an acceptable reception is established. At the same time, transmission of an E signal ("1"s of 20 bits) is executed. Thereafter, program control moves to step S246 at step S284.

At step S286, transmission of a PPh signal (32 baud) is executed, and at step S288, transmission of an ALT signal (50 band) is executed. At the same time, reception of ALT signal is executed and when two ALT signals have been received, an acceptable reception is established.

At step S290, reception of MPh signals is executed, and when two MPh signals have been received, an acceptable reception is established. Transmission of MPh signals is also performed. At least three MPh signals are to be transmitted, and the MPh signal transmission is continued until an acceptable reception of the MPh signals is established. Program control thereafter moves to step S282.

At step S292, a check is performed to determine whether signals Sh and Sh* have been detected or a PPh signal has been detected. When a signal Sh and a signal Sh* are detected, program control advances to step S294. When one PPh signal is detected, program control moves to step S304.

At step S294, Sh signals (48 baud) are transmitted, at step S296, Sh* signals (16 baud) are transmitted, and at step S298, an ALT signal (120 baud) is transmitted. At the same time, reception of an ALT signal is executed, and when one ALT signal is received, reception OK is established.

At step S300, reception of an E signal is executed, and when "1"s of three bits or more have been received, an acceptable reception is established. Transmission of an E signal (one of 40 bits) is also performed. Program control moves from step S302 to step S246.

At step S304, a PPh signal (64 baud) is transmitted, and at step S306, an ALT signal (120 baud) is transmitted. At the same time, reception of an ALT signal is executed, and when one ALT signal has been received, an acceptable reception is established.

At step S308, reception of an MPh signal is executed, and when one MPh signal has been received, an acceptable reception is established. Transmission of an MPh signal is also performed. At least three signals are to be transmitted, and the transmission of the MPh signals continues until an acceptable reception is established. Program control thereafter moves to step S300.

A fourth embodiment according to the present invention will now be described.

As is described above, the designation (or execution) of retrain (sequence) via the control channel is not defined in detail in ITU-T Recommendation V.8 and V.34, and varies depending on the maker. However, since it is difficult to designate the retrain (sequence) via the control channel, to count the number of instructions transmitted in response to the detection of retrain (signal) via the control channel, and to regulate various timers, there is no guarantee that satisfactory communications can be established.

In the fourth embodiment, provided is a facsimile machine that can be easily designed without taking into consideration the total number of re-transmissions of command signals theretofore when the retrain is designated or detected via the control channel, or the elapse of time according to various timers (a timer T4, a timer T2, etc.); that can improve the effectiveness of the design and communication continuation reliability; and that provides a clear condition for halting repetitious processing due to continuous retraining performed across the control channel.

Since the arrangement of the facsimile machine in the fourth embodiment is the same as that shown in FIG. 1, the following explanation will be given while referring to FIG. 1.

A control circuit 20 in the fourth embodiment exercises the following control. When a retrain is designated or detected via the control channel during the conduct of communications conforming to the ITU-T Recommendations V.8 and V.34, the control circuit 20 shifts to the initial state for transmission/reception via the control channel.

When the total count of designations and detections of the retrains via the control channel is equal to or greater than a predetermined number (e.g., four or more), the control circuit 20 discontinues the communication.

During the reception of a response, when the retrain is designated or detected via the control channel, the control circuit 20 clears a three-count re-transmission counter for a command signal, and shifts to the transmission of control channel data to transmit a command signal. During the reception of a command signal, when the retrain is designated or detected, the control circuit 20 clears a timer T2 when it shifts to the reception of control channel data.

FIGS. 17 to 24 are flowcharts showing the control processing performed by the control circuit 20 in the fourth embodiment.

An explanation will be given for response reception after a PPS-Q has been transmitted following the transmission of primary channel information, and command reception after primary channel information has been received.

Figure 17:
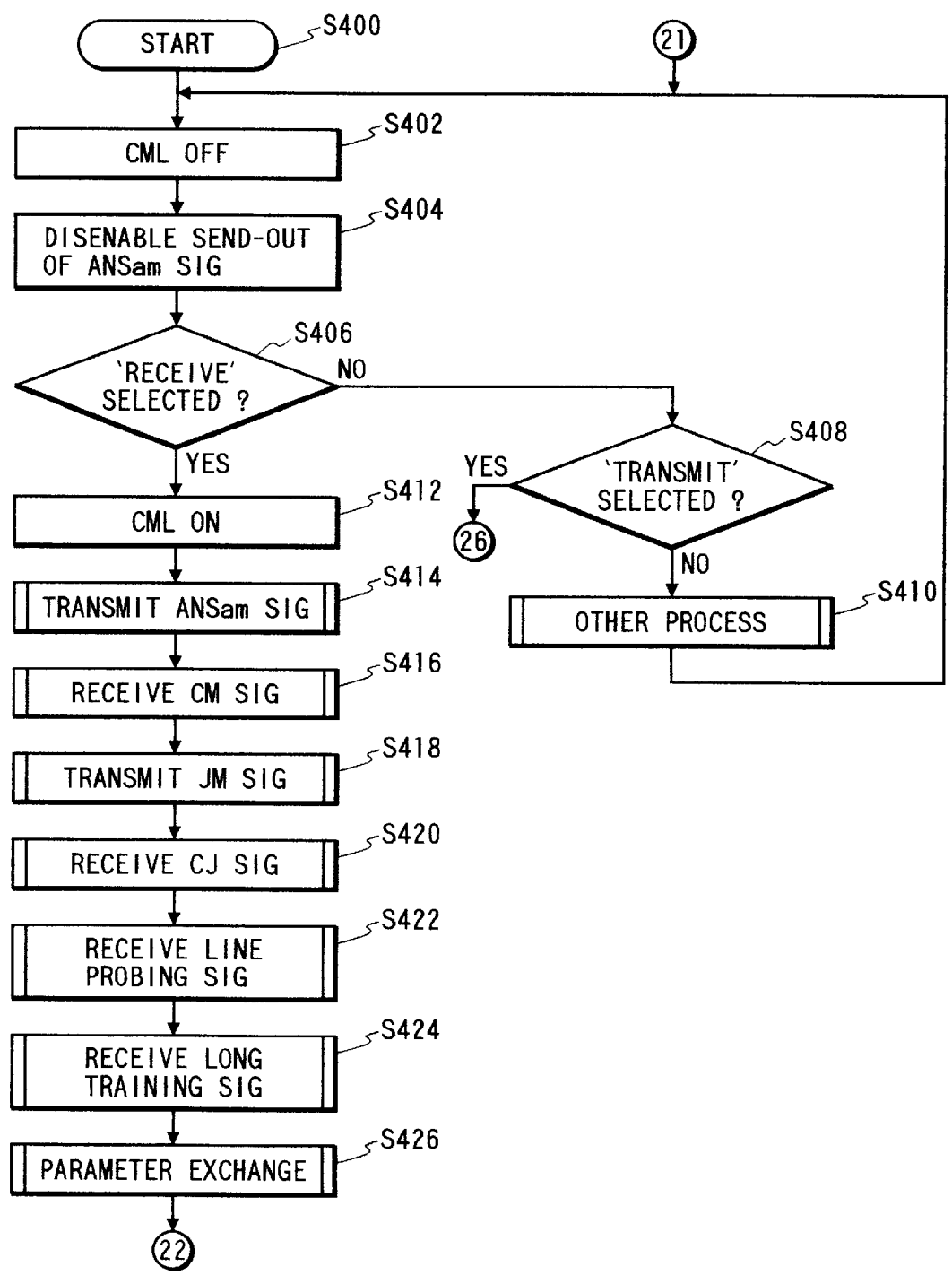
FIG. 17 is a flowchart showing the processing for the fourth embodiment.
Figure 18:
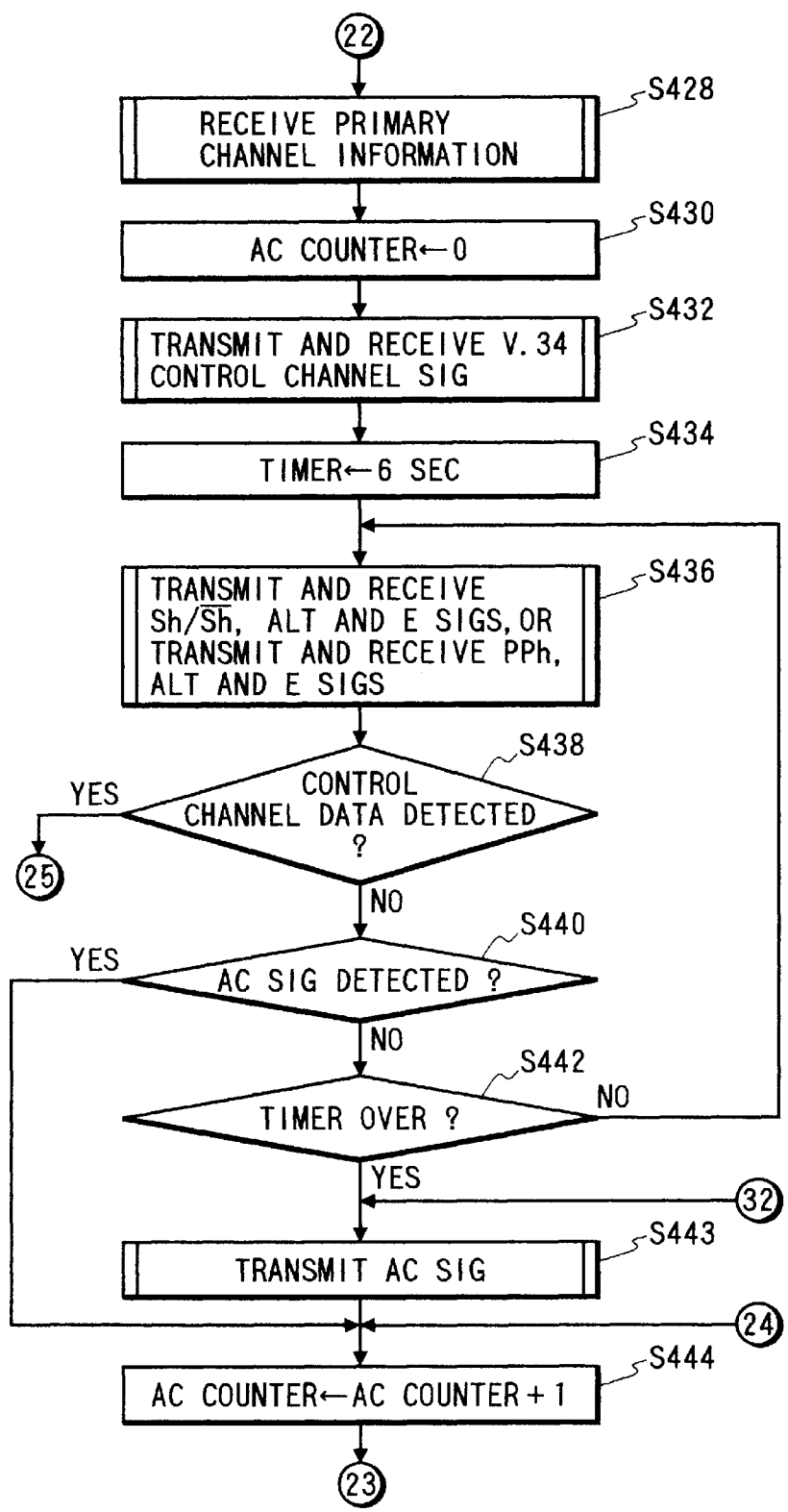
FIG. 18 is a flowchart showing the processing for the fourth embodiment.
Figure 19:
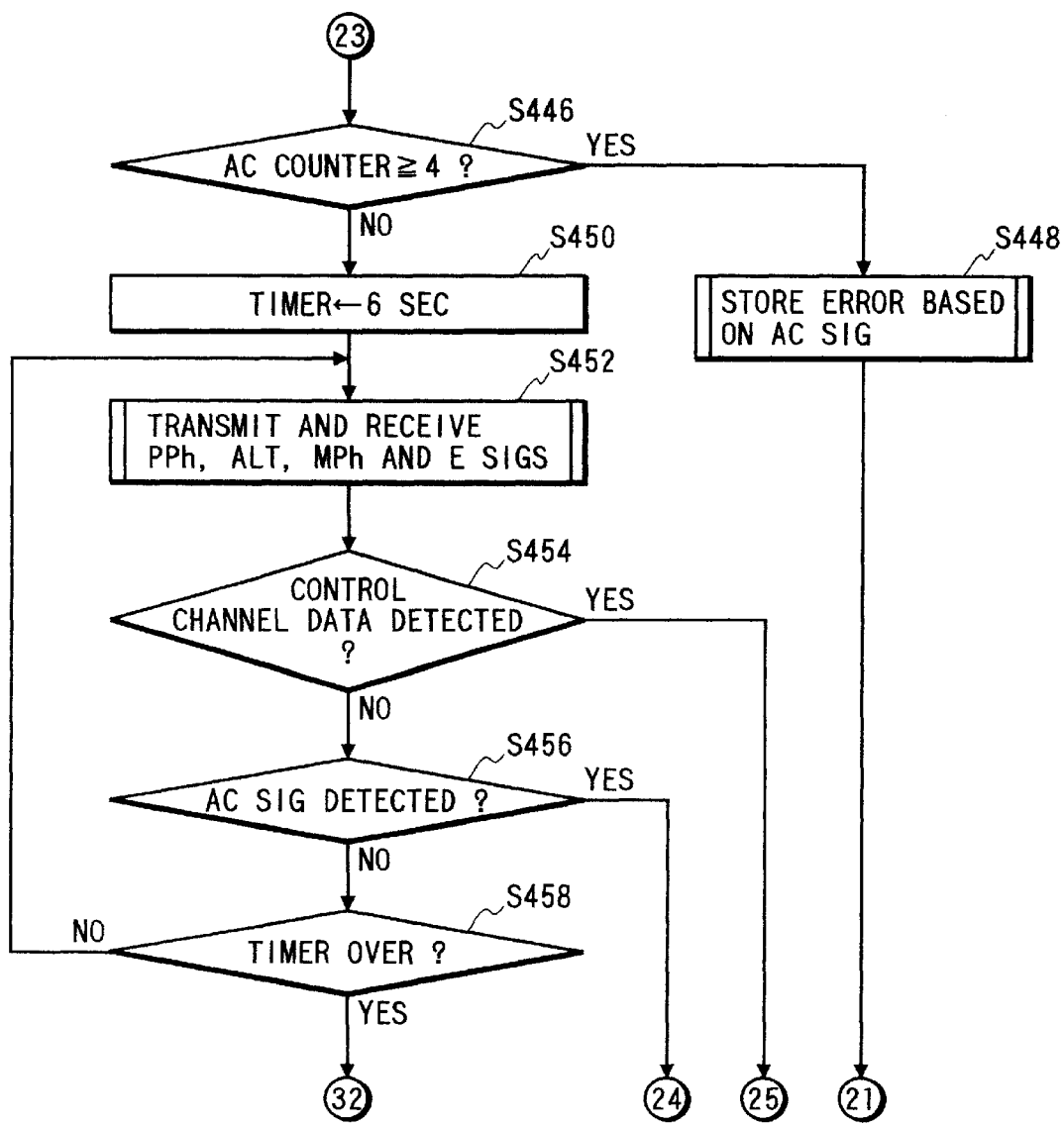
FIG. 19 is a flowchart showing the processing for the fourth embodiment.
Figure 20:
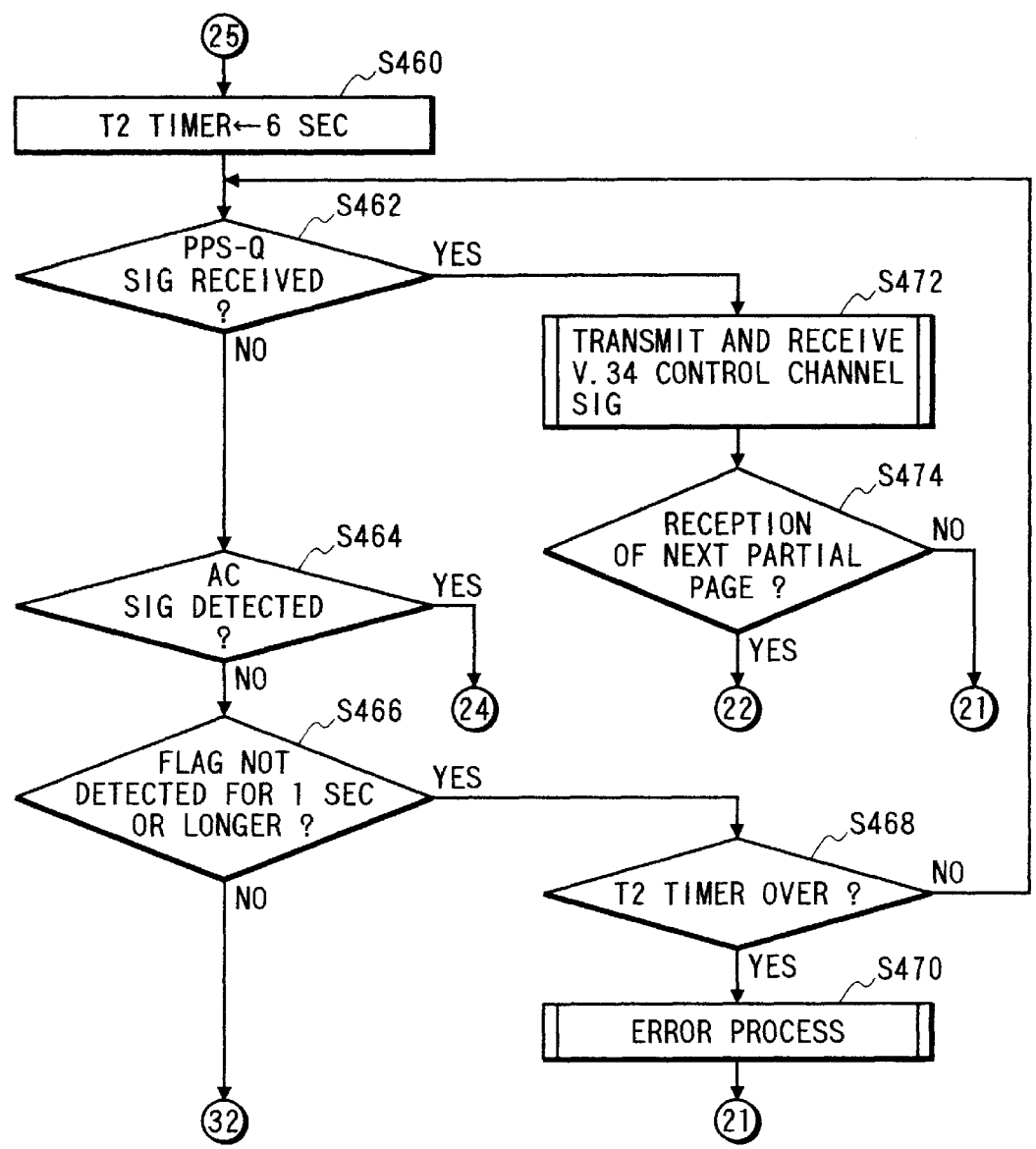
FIG. 20 is a flowchart showing the processing for the fourth embodiment.
Figure 21:
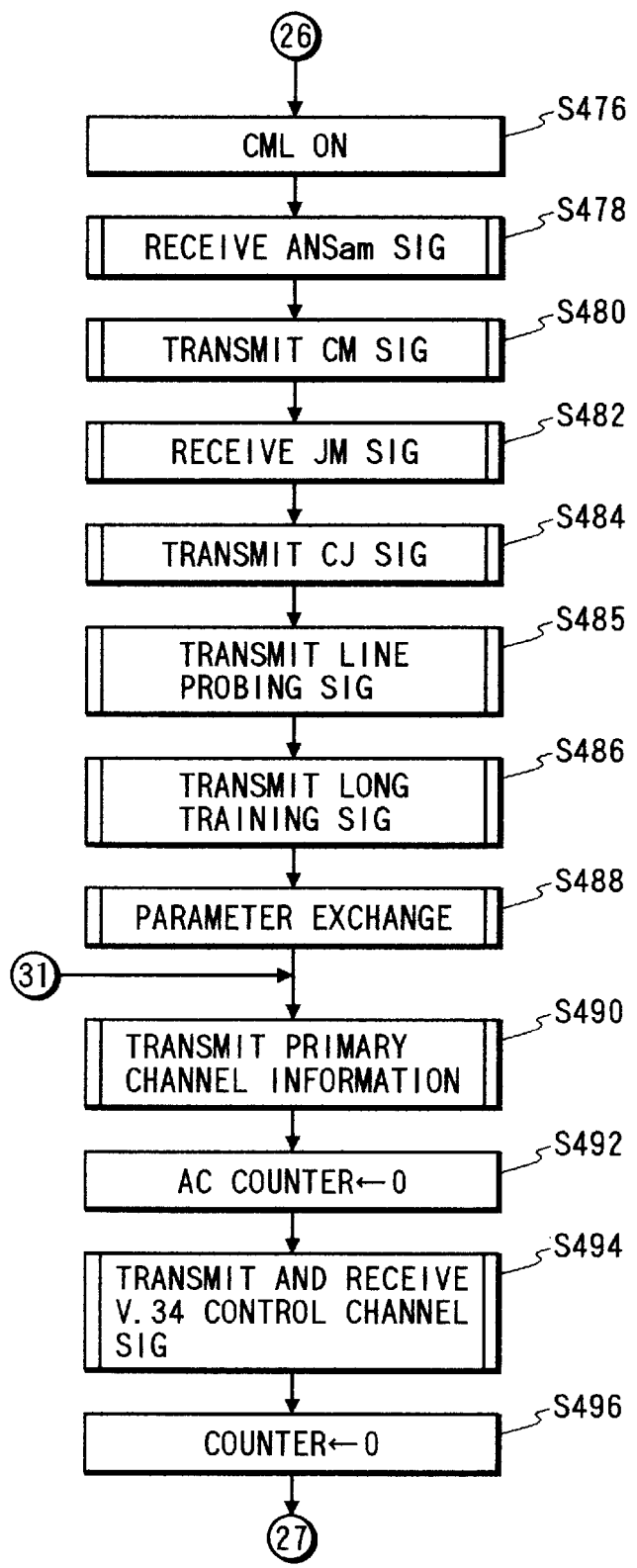
FIG. 21 is a flowchart showing the processing for the fourth embodiment.
Figure 22:
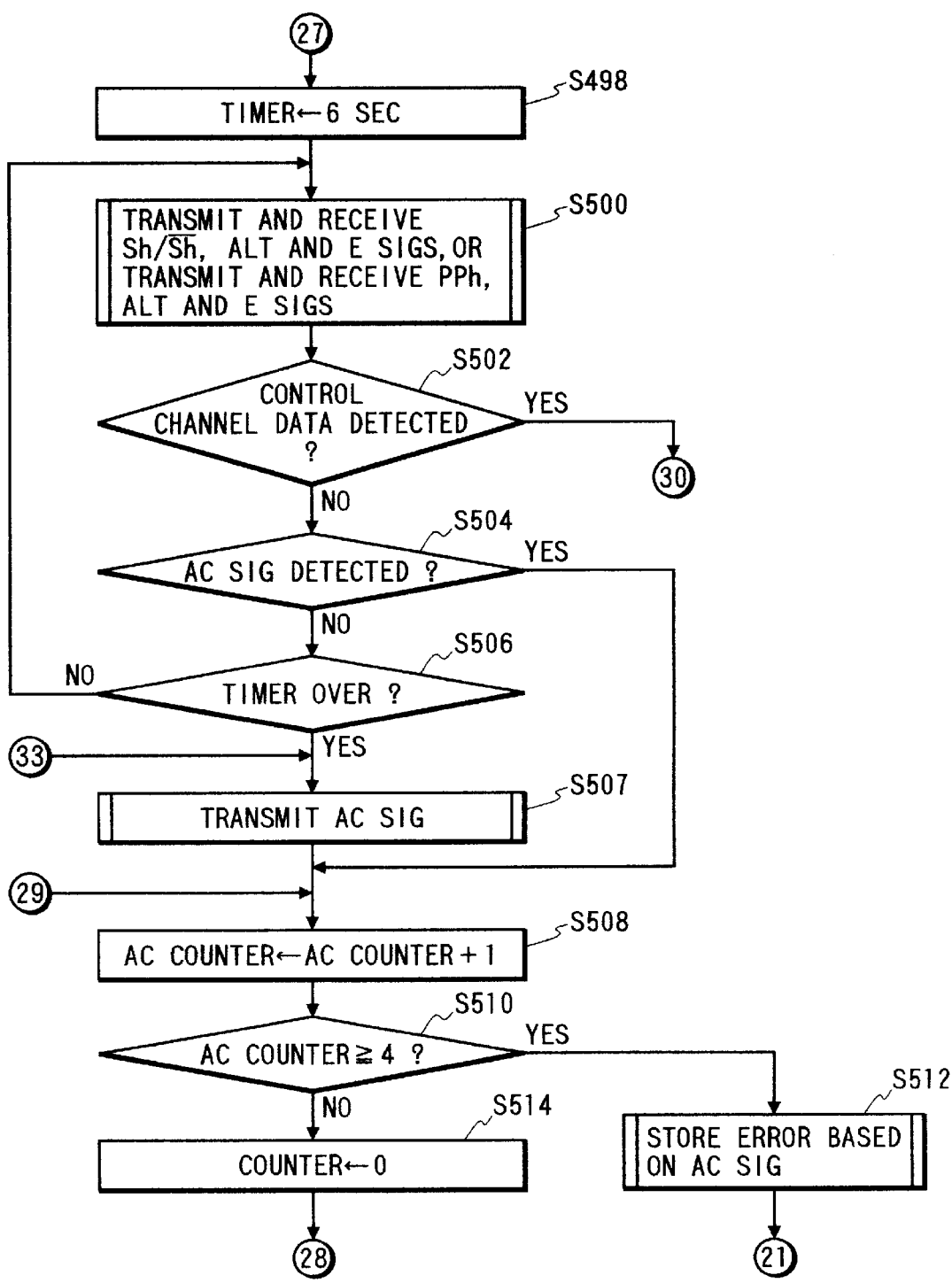
FIG. 22 is a flowchart showing the processing for the fourth embodiment.
Figure 23:
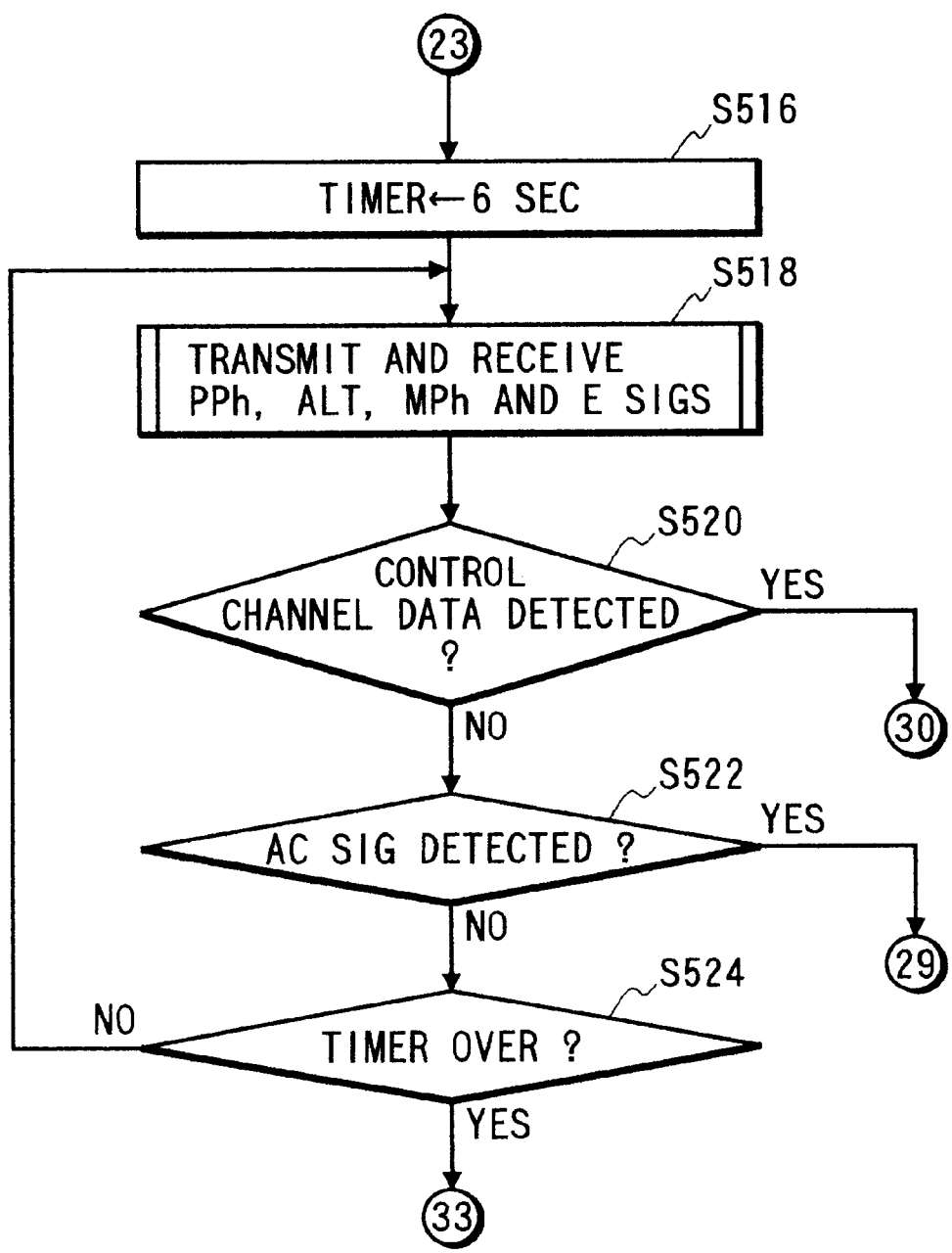
FIG. 23 is a flowchart showing the processing for the fourth embodiment.
Figure 24:
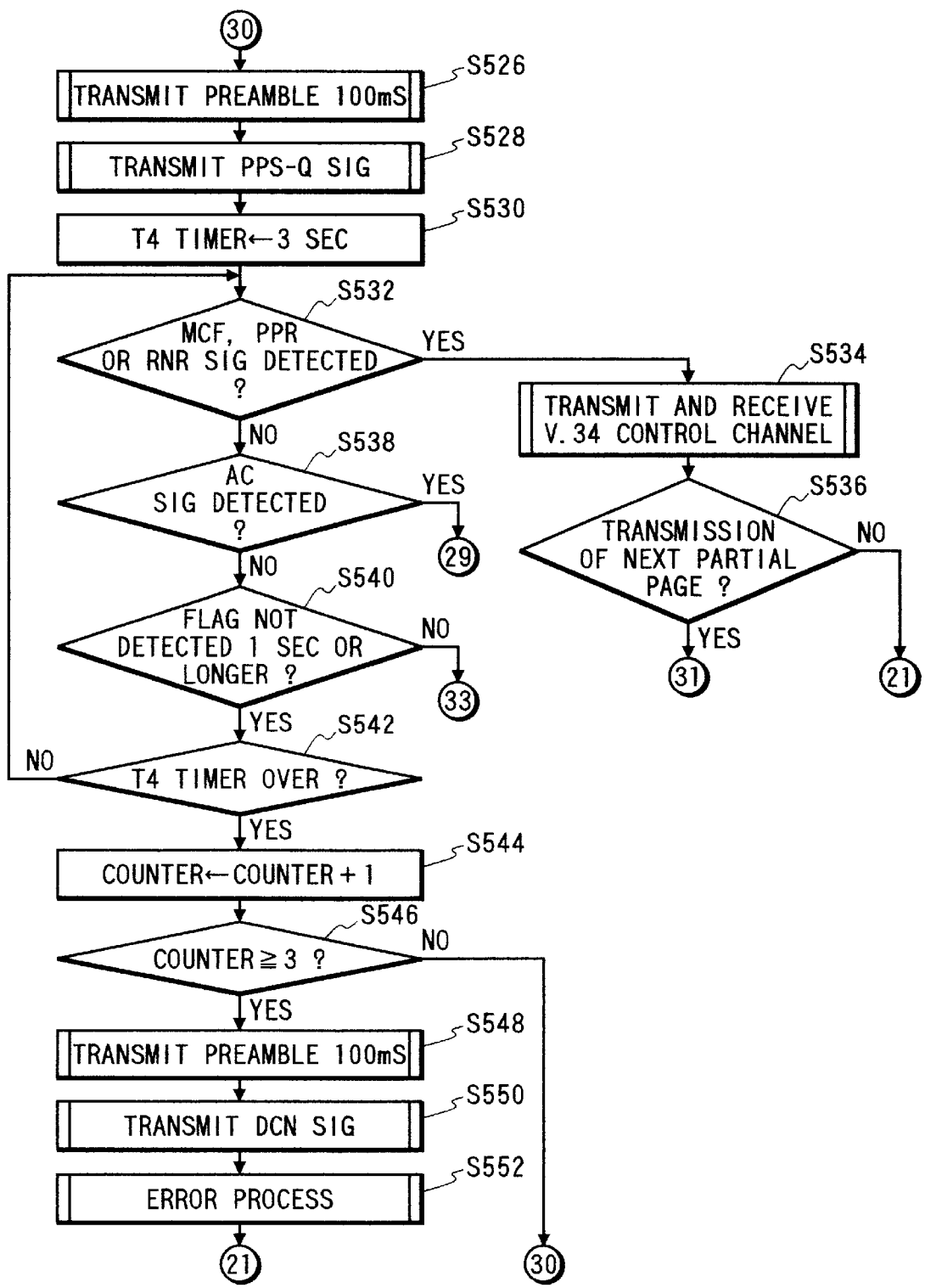
FIG. 24 is a flowchart showing the processing for the fourth embodiment.

In FIG. 17, the control circuit 20 is activated at step S400, and at step S402 outputs to the signal line 20a a signal at level "0" and turns off a CML. At step S404, the control circuit 20 outputs a signal at level "0" to the signal line 20d to set an ANSam signal nontransmission state.

At steps S406 and S408, a check is performed to determine whether reception or transmission has been selected. When reception has been selected, program control moves to step S412, and when transmission has been selected, program control goes to step S476. When neither of them has been selected, program control moves to step S410, whereat the other process is performed. Thereafter, program control returns to step S402.

At step S412, a signal at level "1" is output to the signal line 20a and the CML is turned on. Following this, the transmission of an ANSam signal at step S414, the reception of a CM signal at step S416, transmission of a JM signal at step S418, the reception of a CJ signal at step S420, the reception of a line probing signal at step S422, the reception of a long training signal at step S424, the exchange of parameters at step S426, and the reception of primary channel information at step S428 are sequentially performed.

At step S430, a counter AC counter, which acquires the sum of designations and detections of the retrains, is cleared. At step S432, the transmission/reception of a V.34 control channel signal is performed, and at step S434, a timer Timer is set as six seconds for the detection of control channel data.

At step S436, either the transmission/reception of signals Sh, Sh*, ALT and E, or the transmission/reception of signals PPh, ALT, MPh and E is performed.

At step S438, a check is performed to determine whether or not control channel data have been detected. When control channel data have been detected, program control moves to step S460, and when control channel data have not been detected, program control advances to step S440. At step S440, a check is performed to determine whether an AC signal (retrain) is detected. If an AC signal has been detected, program control moved to step S444, whereat the value of the AC counter is incremented by one. If an AC signal has not been detected, program control goes to step S442.

At step S442, a check is performed to determine whether the Timer times out. When the Timer times out, program control advances to step S443, whereat an AC signal is transmitted to designate the retrain. If the Timer dose not time out, program control moves to step S436.

At step S446, a check is performed to determine whether the count of the AC counter is four or greater, i.e., whether the sum of designations and detections of the retains is four or greater. When the sum is four or greater, program control moves to step S448, whereat an error due to an AC signal is stored. When the sum is less than four, program control goes to step S450.

At step S450, the timer Timer is set as six seconds for the detection of control channel data. At step S452, transmission/reception of signals PPh, ALT, MPh and E is performed.

At step S454, a check is performed to determine whether control channel data have been detected. If control channel data have been detected, program control moves to step S460. When control channel data have not been detected, program control advances to step S456.

At step S456, a check is performed to determine whether or not an AC signal (retrain) has been detected. If an AC signal has been detected, program control returns to step S444, and if an AC signal has not been detected, program control advances to step S458. At step S458, a check is performed to determine whether the Timer times out. When the Timer times out, program control advances to step S443 and when the Timer does not time out, program control moves to step S452.

At step S460, a timer T2 is set as six seconds, and at step S462 a check is performed to determine whether a PPS-Q signal has been received. When a PPS-Q signal has been received, program control advances to step S472, whereat the transmission/reception of a V.34 control channel signal is executed. When a PPS-Q signal has not been received, program control moves to step S464.

At step S464, a check is performed to determine whether or not an AC signal (retrain) has been detected. If an AC signal has been detected, program control returns to step S444, and if an AC signal has not been detected, program control advances to step S466.

At step S466, a check is performed to determine whether for a period of one second or more there has been no flag detected. If no flag has been detected for one second or longer, program control returns to step S443. If no flag has been detected for less than one second, program control goes to step S468.

At step S468, a check is performed to determine whether the T2 timer times out. When the timer does not time out, program control advances to step S462, and when the timer times out, program control moves to step S470, whereat an error process is performed. Program control thereafter returns to step S402.

At step S474, a check is performed to determine whether the next partial page is to be received. If the decision is YES, program control returns to step S428, but if the decision is NO, program control returns to step S402.

At step S476, a signal at a level "1" is output to the signal line 20a and the CML is turned on. Following this, the transmission of an ANSam signal at step S478, the reception of a JM signal at step S482, the transmission of a CJ signal at step S484, the transmission of a line probing signal at step S485, the transmission of a long training signal at step S486, the exchange of parameters at step S488, and the transmission of primary channel information at step S490 are performed.

At step S492, a counter (AC counter), which acquires the sum of designations and detections of the retrains via the control channel, is cleared.

At step S494, the transmission/reception of a V.34 control channel signal is executed, and at step S496 a three-count re-transmission counter Counter for a PPS-Q signal is cleared. At step S498, the timer Timer is set as six seconds for the detection of control channel data, and at step S500, the transmission/reception of signals Sh, Sh+, ALT and E, or the transmission/reception of signals PPh, ALT, MPh and E, is performed.

At step S502, a check is performed to determine whether or not control channel data have been detected. When control channel data have been detected, program control moves to step S526, and when control channel data have not been detected, program control advances to step S504.

At step S504, a check is performed to determine whether an AC signal (retrain) has been detected. If an AC signal has been detected, program control moves to step S508, whereat the value of the AC counter is incremented by one. If an AC signal has not been detected, program control goes to step S506.

At step S506, a check is performed to determine whether the Timer times out. When the Timer does not time out, program control returns to step S500. If the Timer times out, program control moves to step S507, whereat an AC signal is transmitted to designate the retrain.

At step S510, a check is performed to determine whether the count of the AC counter is four or greater, i.e., whether the sum of designations and detections of the retains is four or greater. When the sum is four or greater, program control moves to step S512, whereat an error due to an AC signal is stored. When the sum is less than four, program control goes to step S514, whereat the three-count PPS-Q re-transmission counter Counter is cleared.

At step S516, the timer Timer is set as six seconds for the detection of control channel data. At step S518, the transmission/reception of signals PPh, ALT, MPh and E is performed.

At step S520, a check is performed to determine whether control channel data have been detected. If control channel data have been detected, program control moves to step S526. When control channel data have not been detected, program control advances to step S522. At step S522, a check is performed to determine whether or not an AC signal (retrain) has been detected. If an AC signal has been detected, program control returns to step S508, and if an AC signal has not been detected, program control advances to step S524.

At step S524, a check is performed to determine whether the Timer times out. When the Timer times out, program control returns to step S507, but when the Timer does not time out, program control returns to step S518.

At step S526, the transmission of a preamble 100 mS is executed, and at step S528, a PPS-Q signal is transmitted. At step S530, a timer T4 is set as three seconds, and at step S532, a check is performed to determine whether one signal of an MCF, a PPR, and an RNR has been detected. When one of these signals has been detected, program control moves to step S534, whereat the transmission/reception via the V.34 control channel is executed. Program control thereafter advances to step S536. When none of the signals has been detected, program control advances to step S538.

At step S536, a check is performed to determine whether the next partial page is to be transmitted. If the decision is YES, program control returns to step S490, and if the decision is NO, program control returns to step S402.

At step S538, a check is performed to determine whether an AC signal (retrain) has been detected. If an AC signal has been detected, program control moves to step S508, and if an AC signal has not been detected, program control goes to step S540.

At step S540, a check is performed to determine whether for a period of one second or more there has been no flag detected. If no flag has been detected for one second or longer, program control returns to step S507. If no flag is detected for less than one second, program control goes to step S542.

At step S542, a check is performed to determine whether the T4 timer times out. When the timer does not time out, program control returns to step S532 and when the timer times out, program control advances to step S544, whereat the value of the PPS-Q re-transmission counter Counter is incremented by one.

At step S546, a check is performed to determine whether the count of the PPS-Q re-transmission counter Counter is three or greater. When the count is three or greater, program control advances to step S548, and when the count is less than three, program control returns to step S526.

Then, the transmission of preamble 100 mS at step S548, the transmission of a DCN signal at step S550, and an error process at step S552 are sequentially performed. Program control thereafter returns to step S402.

As a modification of the above described fourth embodiment, the same processing may be performed at timings other than those for the response reception and the command reception.

A fifth embodiment according to the present invention will now be described.

In the above described ITU-T Recommendations V.8 and V.34, there are no rules either concerning the how to use carrier detection, which a modem outputs as a status as to whether a significant signal has been received from a partner's station, or concerning designation of the retrain via a control channel.

Since a control channel for communication conforming to the ITU-T Recommendations V.8 and V.34 is of full-duplex, and a primary channel is of half-duplex, the reliability of the carrier detection signals differs. Specifically, the carrier detection in communication via the control channel is less reliable because of full-duplex. If the retrain is effected via the control channel based on the carrier detection, the retrain is executed even though the reception data are correctly demodulated, sequently resulting in a communication error.

In the fifth embodiment of the present invention, provided is a facsimile machine that, in full-duplex communications via the control channel, shifts to the retrain process by rendering OFF less reliable carrier detection, and holds the communication.

Since the arrangement of the facsimile machine in the fifth embodiment is the same as that in FIG. 1, an explanation will be given while referring to FIG. 1. It should be noted that a control circuit 20 in the fifth embodiment exercises the following control.

When the control circuit 20 is to be shifted to the transmission of control channel data while engaging in the communications via the control channel that conforms to the ITU-T Recommendations V.8 and V.34, the control channel retrain process is inhibited by rendering OFF the carrier detection that indicates the detection of control channel data from the partner's station. When a procedure signal is not detected within a predetermined period of time (e.g., 1.3 seconds) or longer while communicating across the control channel, the control circuit 20 designates the retrain.

The 1.3 seconds (set to a timer) are obtained by adding a detection time of 0.1 second to a line delay of 1.2 seconds.

During the reception via the primary channel, when the control circuit 20 detects the OFF state of the carrier detection, it shifts to reception via the control channel. Specifically, when the reception via the primary channel is begun, the rendering ON of the carrier detection need only be confirmed within 1.3 seconds. Once the control circuit 20 detects the ON state of the carrier detection, it shifts to reception via the control channel in response to the rendering OFF of consecutive carrier detection for 40 mS or longer.

The 1.3 seconds (set to a timer) at the beginning of the reception of primary channel data are also obtained by adding a detection time of 0.1 second to a line delay of 1.2 seconds.

Since a no-tone interval between the primary channel and the control channel is 70 mS±5 mS, once the carrier detection for the primary channel data has been detected, a carrier disconnection of 40 mS is detected and the control circuit 20 is shifted from the reception of primary channel data to the reception of control channel data.

Figure 25:
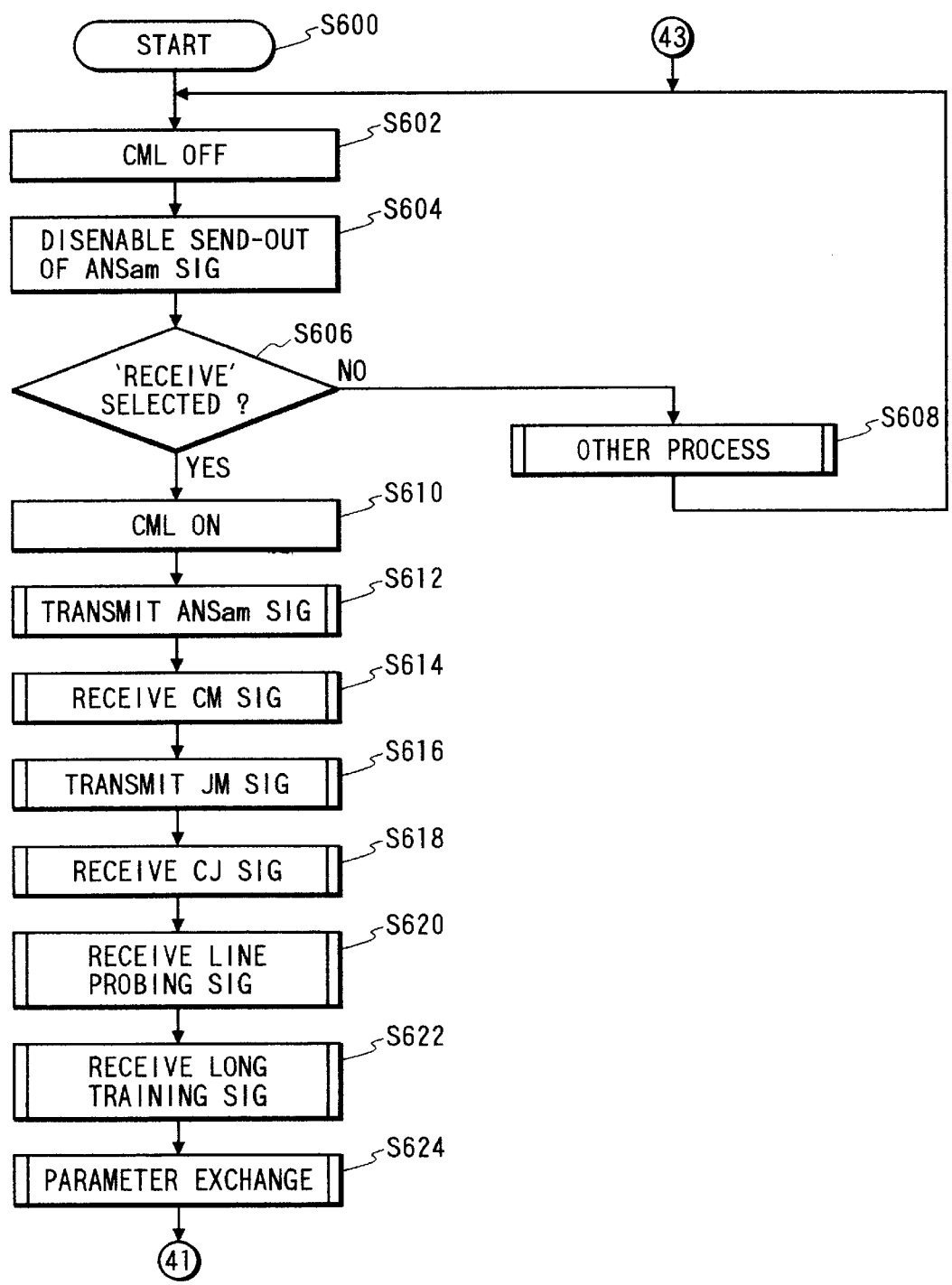
FIG. 25 is a flowchart showing the processing for the fifth embodiment.
Figure 26:
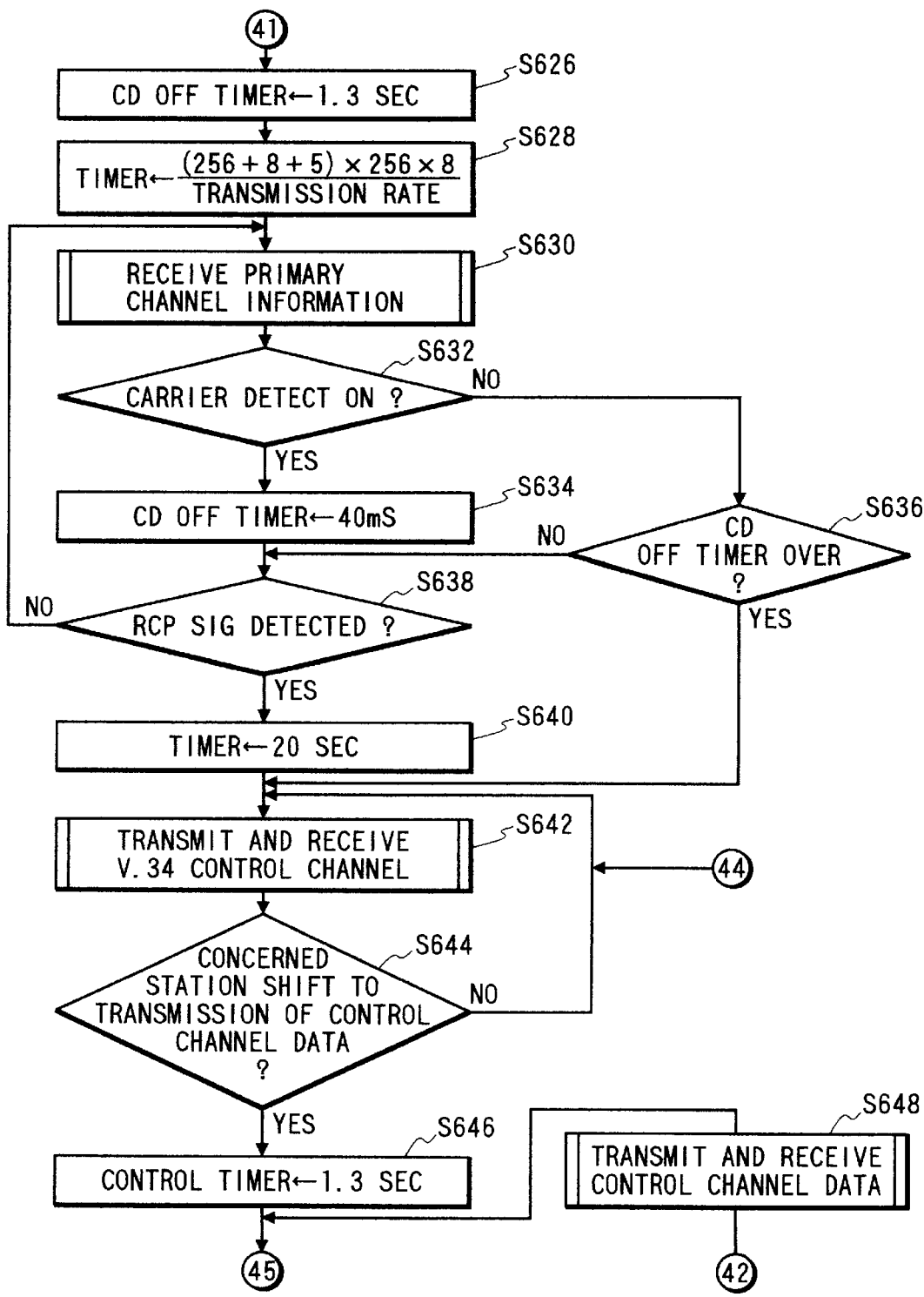
FIG. 26 is a flowchart showing the processing for the fifth embodiment.
Figure 27:
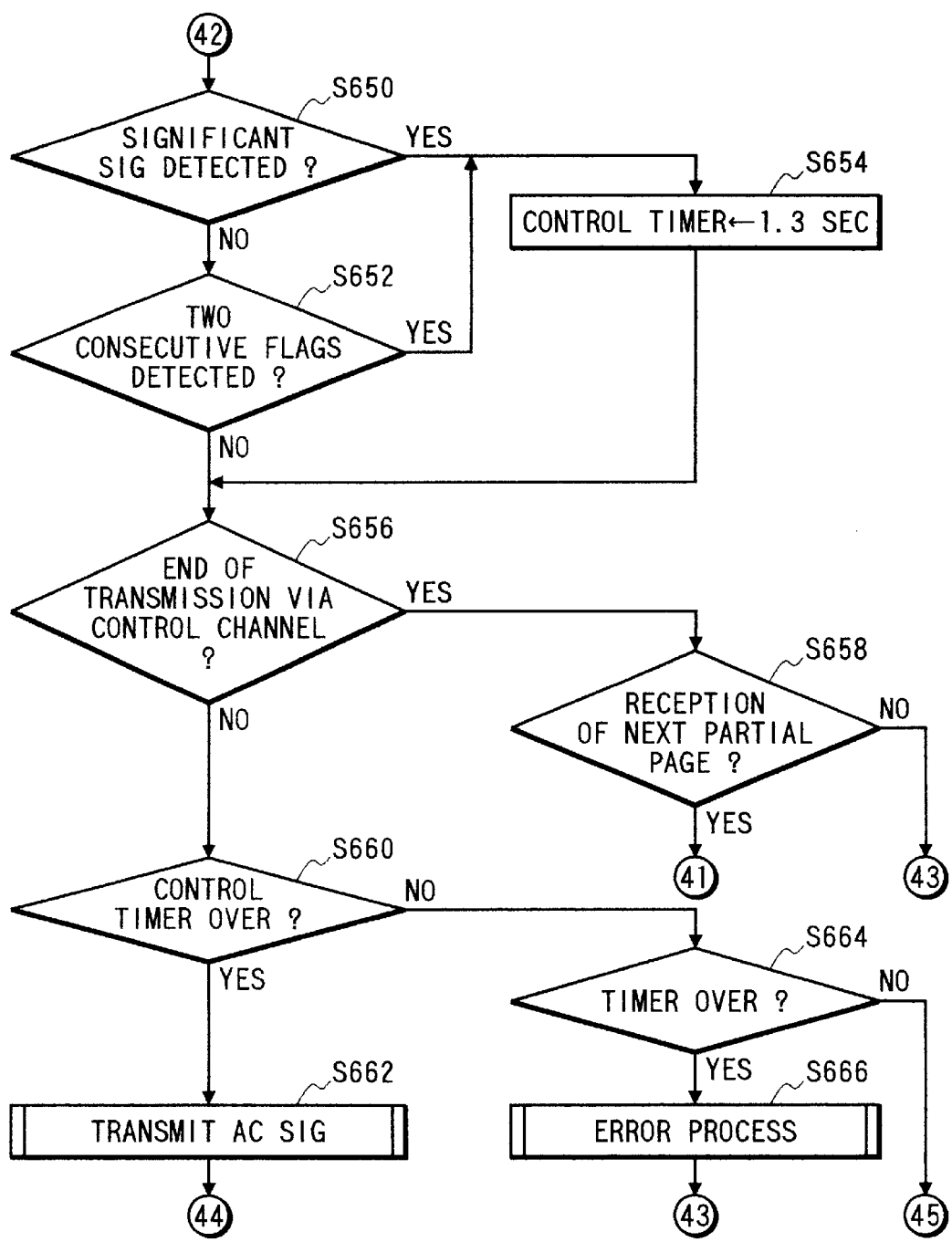
FIG. 27 is a flowchart showing the processing for the fifth embodiment.

FIGS. 25 to 27 are flowcharts showing the control processing performed by the control circuit 20 in the fifth embodiment.

In FIG. 25, the control circuit 20 is activated at step S600, and at step S602, outputs a signal at level "0" to the signal line 20a and turns off a CML. At step S604, the control circuit 20 outputs a signal at level "0" to the signal line 20d to set an ANSam signal non-transmission state.

At steps S606, a check is performed to determine whether reception is selected. When reception is selected, program control moves to step S610, and when it is not selected, program control moves to step S608, whereat the other process is performed. Program control thereafter returns to step S602.

At step S610, a signal at level "1" is output to the signal line 20a and the CML is turned on. Following this, the transmission of an ANSam signal at step S612, the reception of a CM signal at step S614, transmission of a JM signal at step S616, the reception of a CJ signal at step S618, the reception of a line probing signal at step S620, the reception of a long training signal at step S622, and the exchange of parameters at step S624 are sequentially performed.

At step S626, a CD OFF timer is set as 1.3 seconds by taking into account a line delay of 1.2 seconds and a detection time of 0.1 second. At step S628, in order to guarantee reception of control data after a momentary disconnection occurs in case one partial page has 256 frames, 256 frames each having 269 bytes that is the sum of 256 bytes for one frame data, 8 bytes for A, C, FCF, Frame No., FCS, FCS, F and F, and an extra 5 bytes, are divided by a transfer speed, the resultant value is stored in the timer, and the reception of control channel data is continued until the CD-OFF timer times out following the momentary disconnection.

At step S630, the primary channel data are received, and at step S632, the status (carrier detection) via the modem, which indicates that the primary channel data have been received, is examined. When the carrier detection is in the ON state, program control advances to step S634, whereat 40 mS is set to the CD OFF timer. When the carrier detection is OFF, program control moves to step S636.

At step S636, a check is performed to determine whether the CD OFF timer times out. When the timer times out, program control advances to step S642, whereat the process is shifted to the reception of control channel data. If the timer does not time out, program control goes to step S638.

At step S638, a check is performed to determine whether or not an RCP signal has been detected. If an RCP signal has been detected, program control advances to step S640, whereat 20 seconds are set to a timer for transmission of control channel data. Program control thereafter advances to step S642. If an RCP signal has not been detected, program control returns to step S630.

At step S642, the transmission/reception of V.34 control channel data is executed, and at step S644 a check is performed to determine whether a concerned station has been shifted to the transmission of control channel data. When the station has been shifted to the transmission of control channel data, program control advances to step S646, and when the station has not been shifted to the transmission of control channel data, program control returns to step S642.

At step S646, 1.3 seconds are set to a control timer. As previously described, the period of 1.3 seconds are obtained by adding a line delay of 1.2 seconds to a detection time of 0.1 second. At step S648, the transmission/reception of control channel data is executed.

At step S650, a check is performed to determine whether a significant signal, such as a PPS-Q signal, can be detected among the control channel data. If a significant signal is detected, program control moves to step S654, and if a significant signal is not detected, program control advances to step S652.

At step S652, a check is performed to determine whether or not two consecutive flags for control channel data have been detected. When two such flags have been detected, program control moves to step S654, whereat 1.3 seconds are set to the control timer. When two consecutive flags have not been detected, program control advances to step S656.

At step S656, a check is performed to determine whether the transmission via the control channel has been terminated. If the transmission via the control channel has been terminated, program control goes to step S658, and if the transmission has not been terminated, program control advances to step S660.

At step S658, a check is performed to determine whether a next partial page has been received. If YES, program control advances to step S626, and if NO, it returns to step S602.

At step S660, a check is performed to determine whether the control timer times out. If the timer times out, program control goes to step S662, whereat an AC signal is transmitted and the retrain is executed via the control channel. Program control thereafter returns to step S642. When the timer does not time out, program control goes to step S664.

At step S664, a check is performed to determine whether the timer times out. If the timer does not time out, program control returns to step S648. If the timer times out, program control advances to step S666, whereat an error process is performed. Program control thereafter returns to step S602.

A sixth embodiment of the present invention will now be described.

As is described above, in a facsimile machine that can perform communications conforming to the ITU-T Recommendations V.8 and V.34 a retrain signal via the control channel is transmitted at a predetermined timing.

Therefore, if an AC signal (retrain) is detected, while significant data (such as a PPS-Q signal, an MCF signal and a PPR signal) for the control channel data are transmitted, the significant signals are completely destroyed, and a timer for the control channel communication times out, so that communications are disabled.

In the sixth embodiment of the present invention, provided is a facsimile machine which designates the retrain via a control channel while a partner's station is not transmitting significant data (a PPS-Q signal, an MCF signal, a PPR signal, etc.) via a control channel, whereby those significant signals can be protected from being destroyed due to the retrain, and the timer for the control channel can be prevented from timing out, so that the communications can be continued.

Since the arrangement of the facsimile machine in the sixth embodiment is the same as that in FIG. 1, an explanation will be given while referring to FIG. 1. It should be noted that a control circuit 20 in the sixth embodiment exercises the following control.

Specifically, the control circuit 20 designates the retrain, so that, during communications conforming to the ITU-T Recommendations V.8 and V.34, the retrain via the control channel may be detected when a partner's station does not transmit significant data (e.g., PPS-Q, PPR, or an MCF signal) as control channel data.

Specifically, the retrain to be designated when a response is received after transmission of control channel date, is designated after a predetermined time (e.g., 2.2 seconds) following the initiation of the transmission of control channel data via the control channel.

For the designation of the retrain upon the receipt of a response, after transition to reception of the control channel data, the time that must elapse before designating the retrain via the control channel is changed based on a line delay. For example, assuming that a line delay for one-way is td, the retrain is designated following the elapse of the time calculated by subtracting 2td from 2.5 seconds.

FIGS. 28 to 34 are flowcharts showing the control exercised by the control circuit 20 according to the sixth embodiment.

An explanation will be given for an example where signals Sh and Sh* are used to initiate the reception of a response at the time of the transmission of a PPS-Q signal, the reception of a command after the primary transmission of data for one page have been received, and the transmission of signals.

Figure 28:
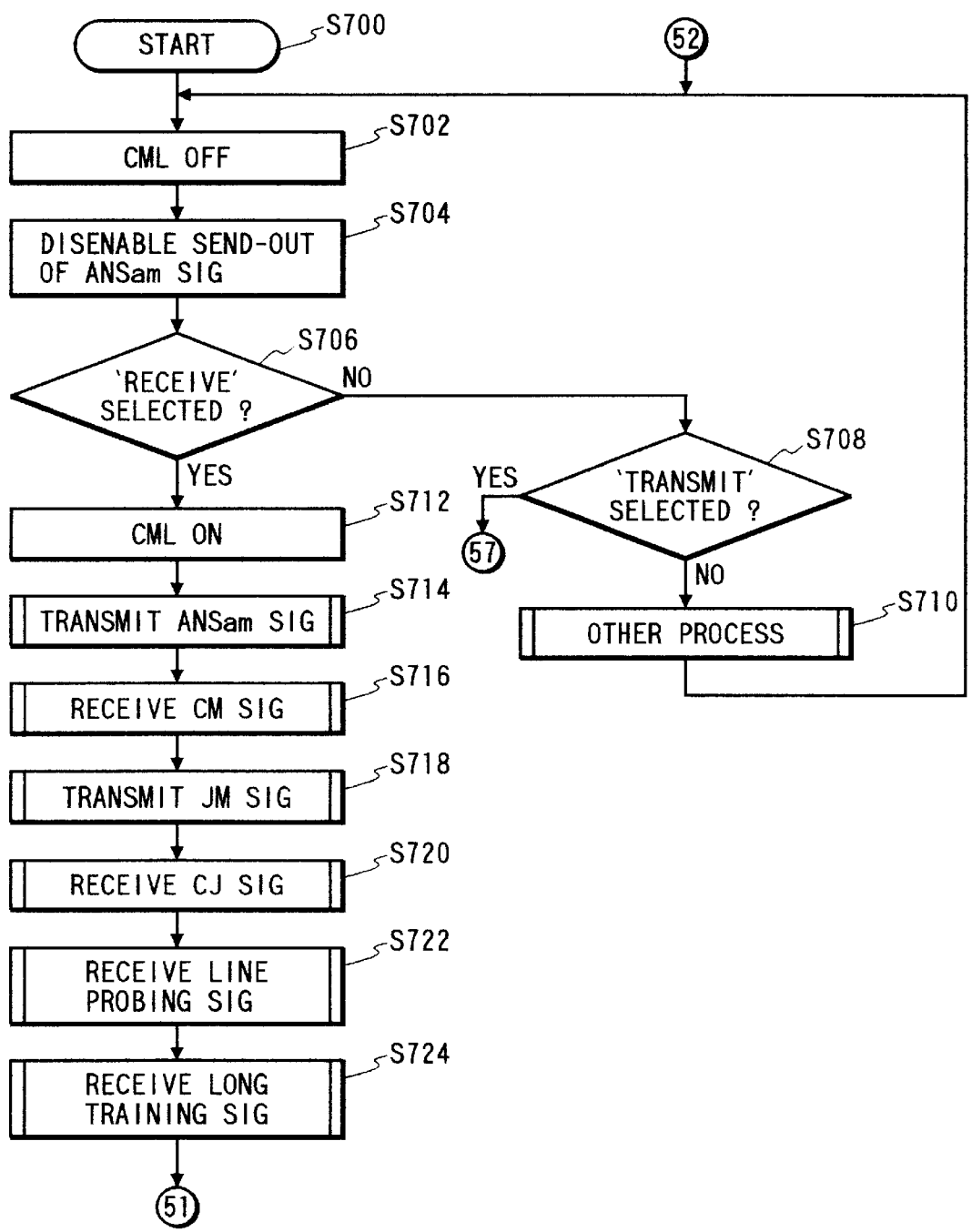
FIG. 28 is a flowchart showing the processing for the sixth embodiment.
Figure 29:
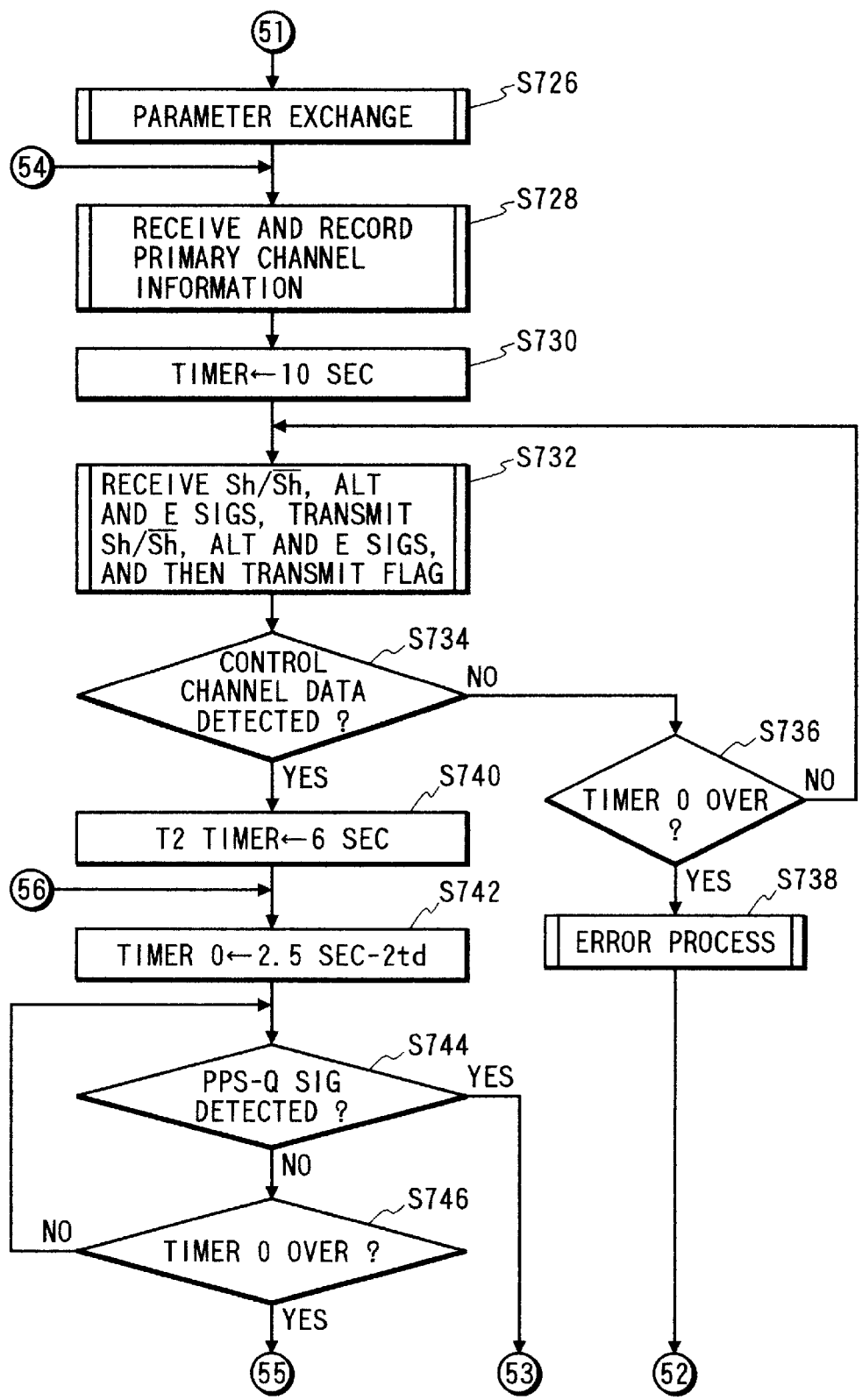
FIG. 29 is a flowchart showing the processing for the sixth embodiment.
Figure 30:
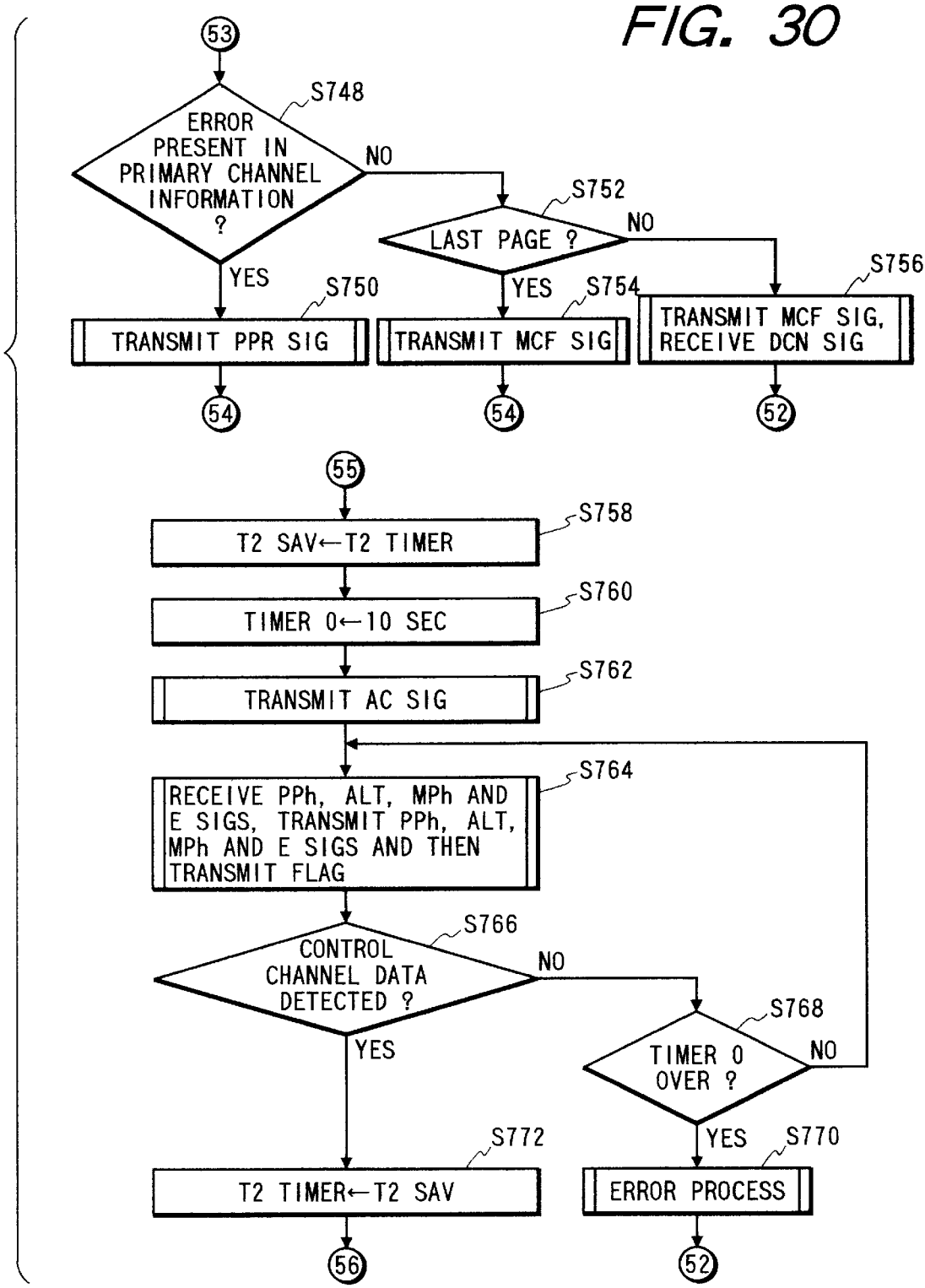
FIG. 30 is a flowchart showing the processing for the sixth embodiment.
Figure 31:
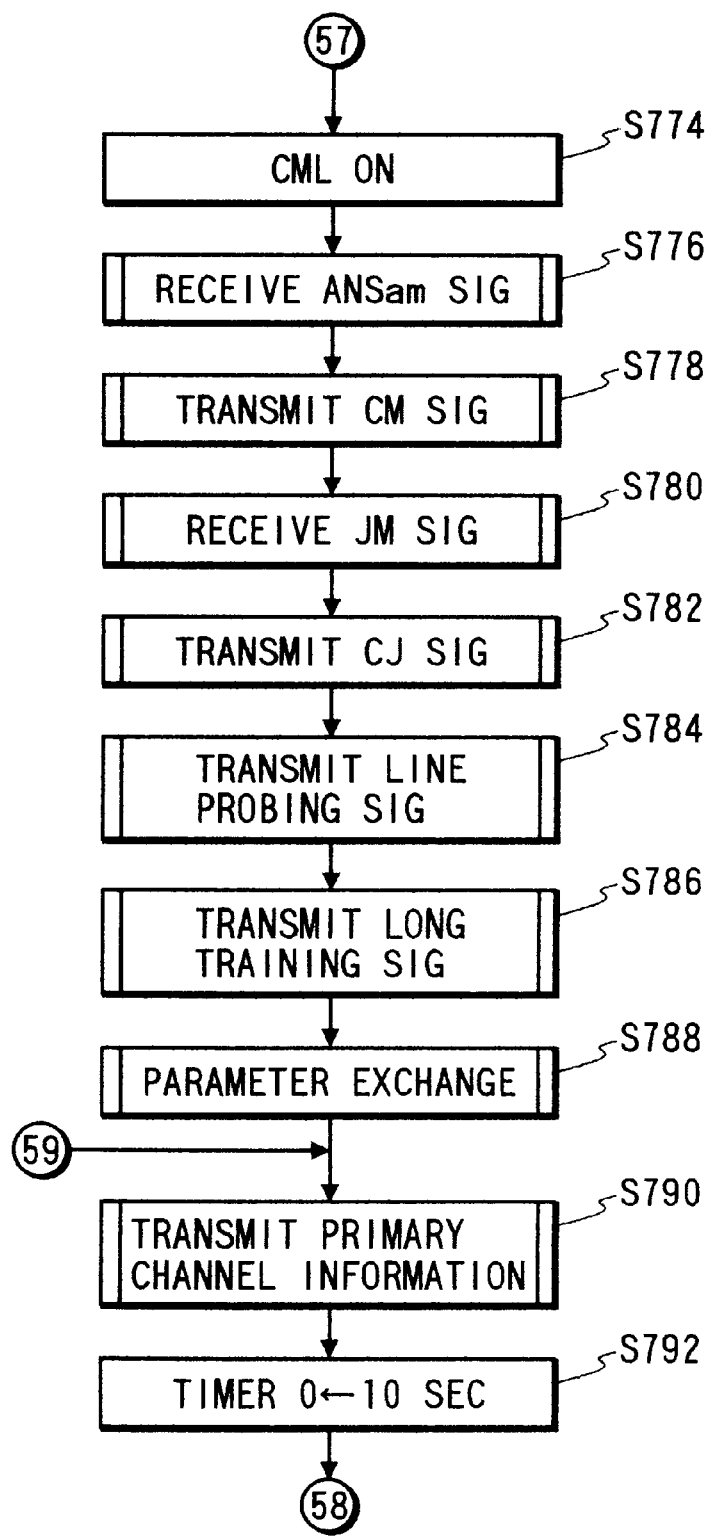
FIG. 31 is a flowchart showing the processing for the sixth embodiment.
Figure 32:
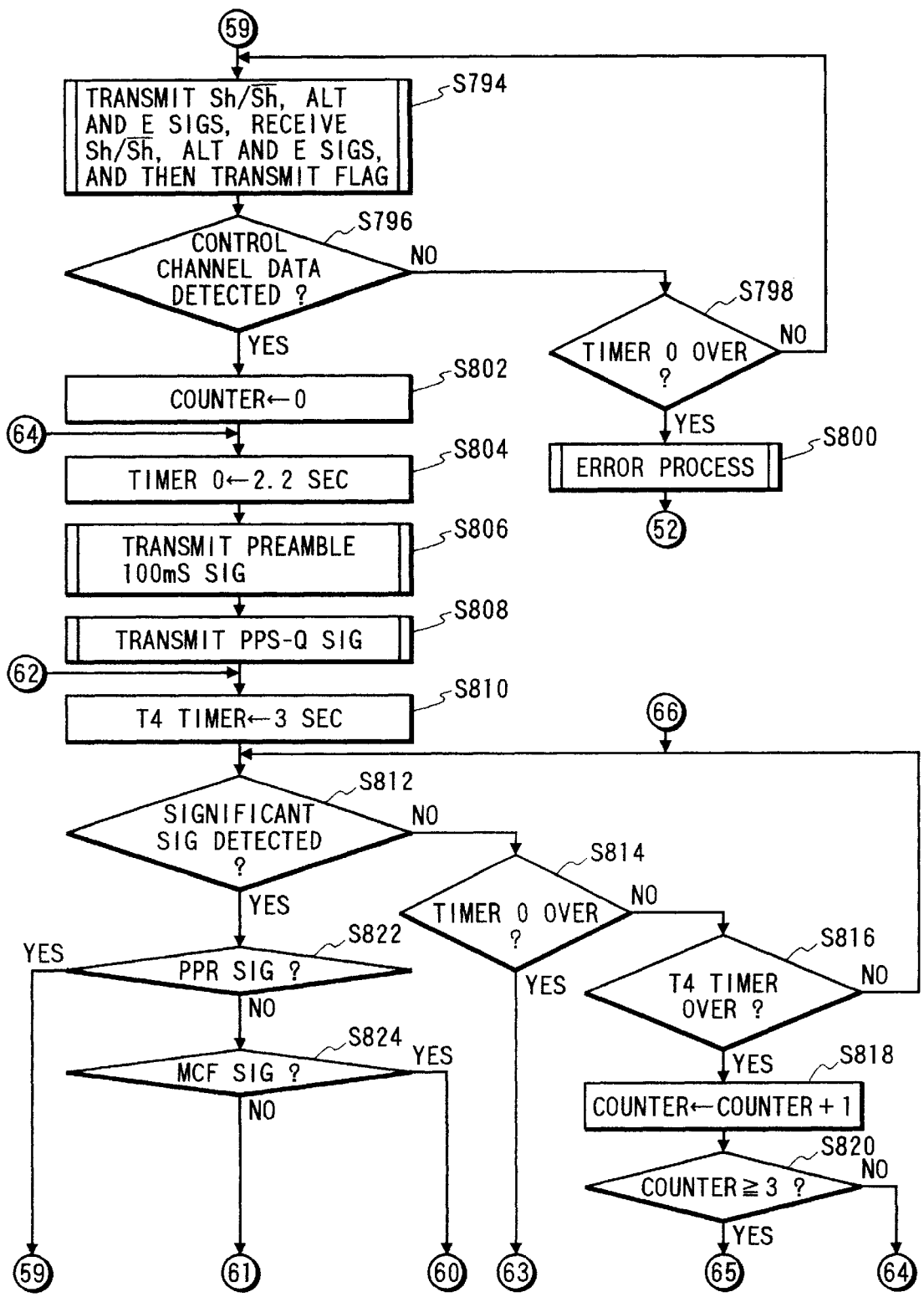
FIG. 32 is a flowchart showing the processing for the sixth embodiment.
Figure 33:
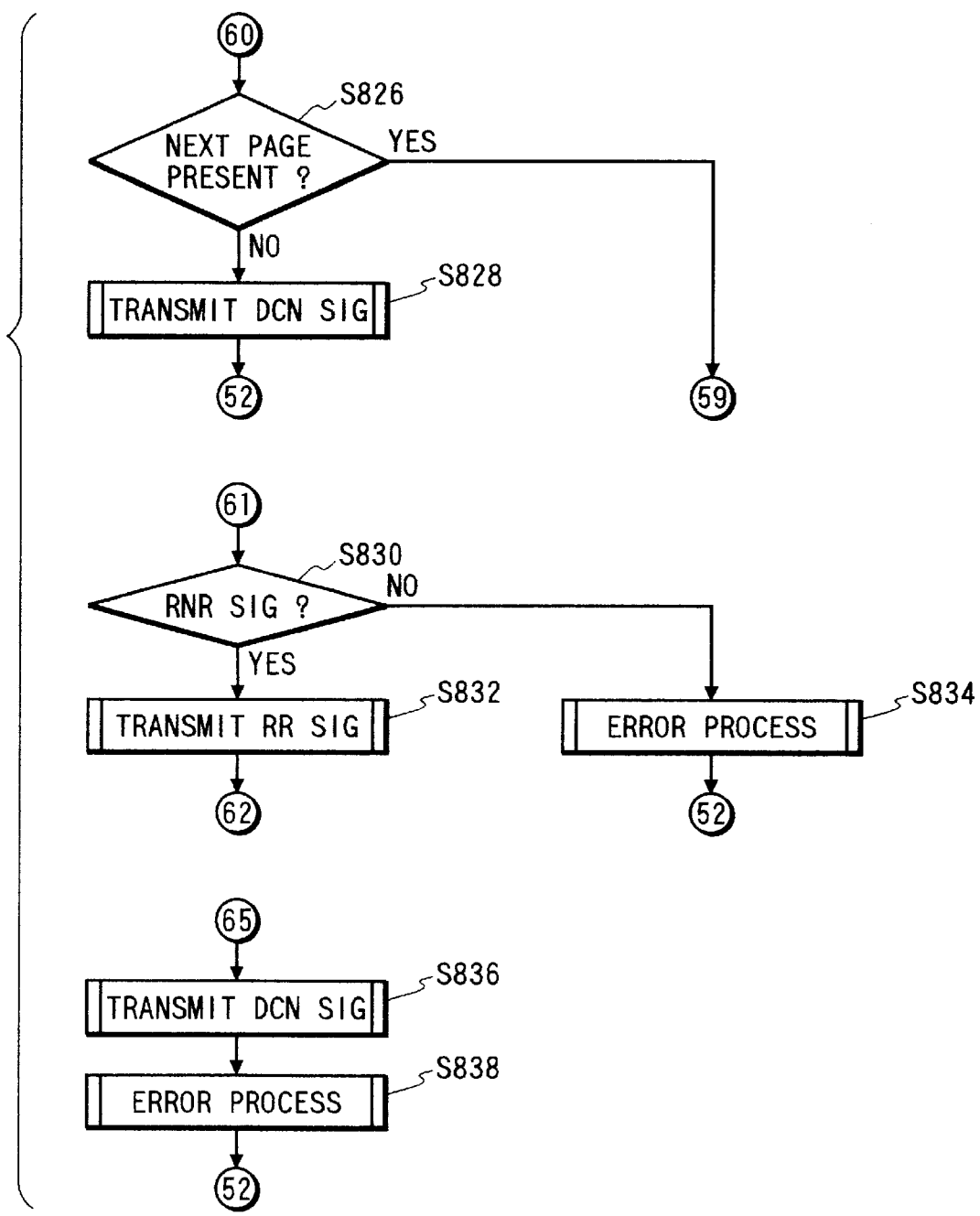
FIG. 33 is a flowchart showing the processing for the sixth embodiment.
Figure 34:
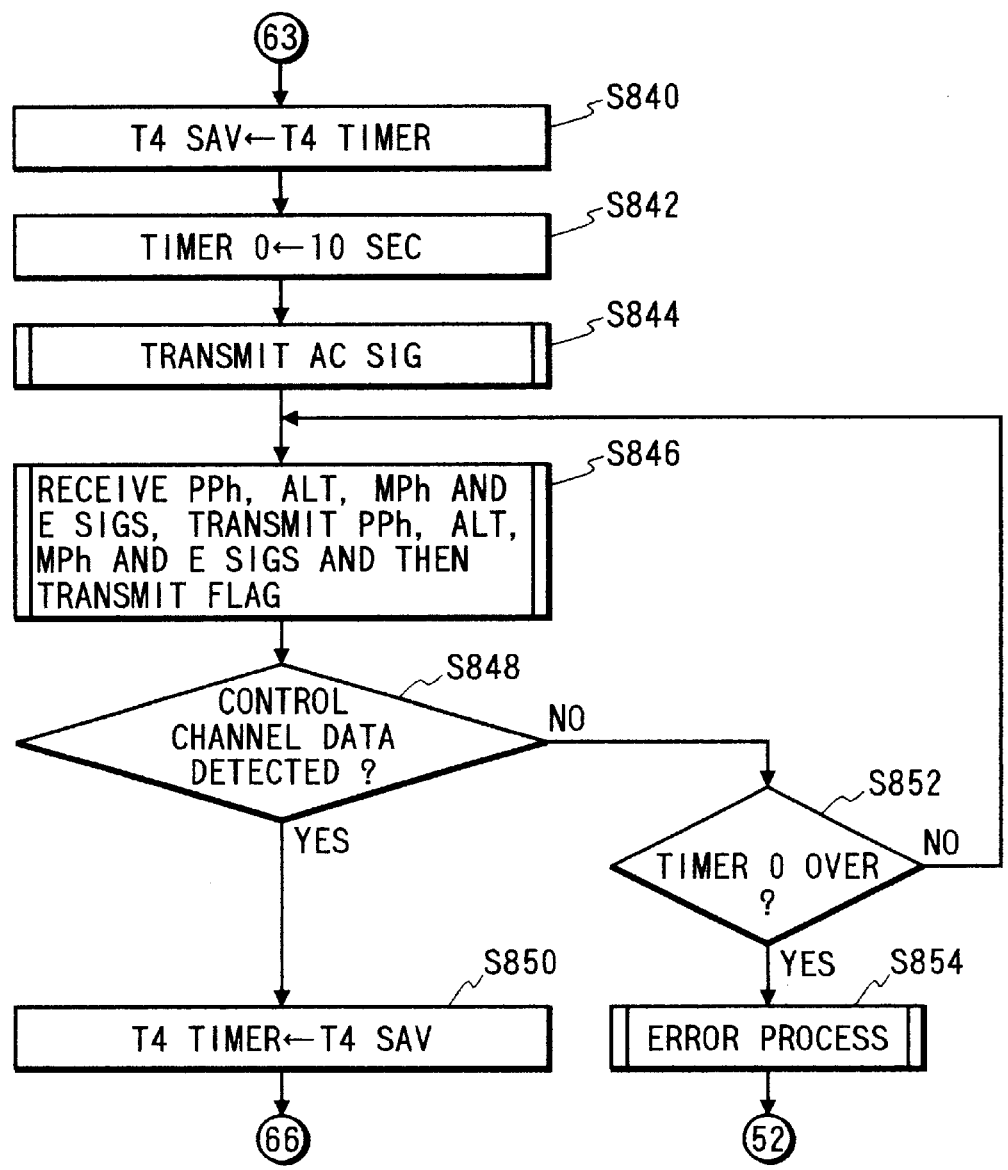
FIG. 34 is a flowchart showing the processing for the sixth embodiment.

In FIG. 28, the control circuit 20 is activated at step S700, and at step S702, it outputs a signal at level "0" across the signal line 20a and turns off a CML. At step S704, the control circuit 20 outputs a signal at level "0" across the signal line 20d to set an ANSam signal non-transmission state.

At steps S706 and S708, a check is performed to determine whether reception or transmission is selected. When reception is selected, program control moves to step S712, and when transmission is selected, program control goes to step S774. When neither of them is selected, program control moves to step S710, whereat the other process is performed. Program control thereafter returns to step S702.

At step S712, a signal at level "1" is output across the signal line 20a and the CML is turned on. Following this, the transmission of an ANSam signal at step S714, the reception of a CM signal at step S716, the transmission of a JM signal at step S718, and the reception of a CJ signal at step S720 are sequentially performed.

At step S722, a line probing signal is received. At this time, a one-way delay time td for the line is considered and recorded. Then, the reception of a long training signal at step S724, the exchange of parameters at step S726, and the reception and recording of primary channel information at step S728 are sequentially performed.

At step S730, a timer is set as 10 seconds for the detection of control channel data. At step S732, reception of signals Sh, Sh+, ALT and E, and the transmission of signals Sh, Sh+, ALT and E are performed. When the E signal has been transmitted, transmission of a flag is executed.

At step S734, a check is performed to determine whether or not control channel data have been detected. When control channel data have been detected, program control advances to step S740, and when control channel data have not been detected, program control advances to step S736.

At step S736, a check is performed to determine whether the timer times out. If the timer times out, program control advances to step S738, whereat an error process is performed and program control thereafter returns to step S702. If the timer does not time out, program control returns to step S732.

At step S740, 6 seconds are set to a timer (timer T2) to receive commands, and at step S742, a time period (2.5 seconds–2td) is set to a timer (timer 0) for designating the retrain. This time period will be described later.

At step S744, a check is performed to determine whether a PPS-Q signal has been detected among the control channel data. If a PPS-Q signal has been detected, program control moves to step S748; if not, program control advances to step S746. At step S746, a check is performed to determine whether the timer 0 times out. When the timer times out, program control moves to step S758, whereat the retrain is requested (this is the time during which the transmission side does not transmit a PPS-Q signal and during which the retrain process can be detected). When the timer does not time out, program control returns to step S744.

At step S748, a check is performed to determine whether there is an error in the received primary data. If there is an error, program control advances to step S750, whereat a PPR signal is transmitted. Program control thereafter moves to step S728. When there is no error, program control goes to step S752.

At step S752, a check is performed to determine whether a current page is the last page. If the current page is the last page, program control advances to step S754, whereat an MCF signal is transmitted. Program control thereafter moves to step S728. If the current page is not the last page, program control moves to step S756, whereat an MCF signal is transmitted and a DCN signal is received.

At step S758 the time set for the timer T2 is stored in a memory T2 SAV. In other words, the timer T2 is halted.

At step S760, a timing of 10 seconds is set for the timer 0 as the period that will elapse before control channel data are detected. At step S762, an AC signal is transmitted to request the retrain process via the control channel.

At step S764, the reception of signals PPh, ALT, MPh and E, and the transmission of signals PPh, ALT, MPh and E are performed. When the E signal has been transmitted, transmission of a flag is executed.

At step S766 a check is performed to determine whether or not control channel data, which have been transmitted via the control channel from the partner's station, have been detected. When control channel data have been detected, program control advances to step S772, whereat the stored time T2 SAV is used to set the timing for to the timer T2, and the timer T2 begins the count down. Program control thereafter returns to step S742. When the control channel data have not been detected, program control advances to step S768.

At step S768, a check is performed to determine whether the time set for the timer 0 has expired. If the time has expired, program control advances to step S770, whereat an error process is performed. Program control thereafter returns to step S702. If the time has not expired, program control returns to step S764.

At step S774 a signal at level "1" is output to the signal line 20a and the CML is turned on. Following this, the reception of an ANSam signal at step S776, the transmission of a CM signal at step S778, the reception of a JM signal at step S780, the transmission of a CJ signal at step S782, the transmission of a line probing signal at step S784, the transmission of a long training signal at step S786, exchange of parameters at step S788, and the transmission of primary channel data at step S790 are sequentially performed.

At step S792, a timing of 10 seconds is set for the timer 0 as the period that will elapse before control channel data are detected. At step S794, the transmission of signals Sh, Sh+, ALT and E, and the reception of signals Sh, Sh+, ALT and E are performed. When the E signal has been transmitted, transmission of a flag is executed.

At step S796 a check is performed to determine whether or not control channel data, which have been transmitted via the control channel from the partner's station, have been detected. When control channel data have been detected, program control advances to step S802, and when control channel data have not been detected, program control moves to step S798.

At step S798, a check is performed to determine whether the time set for the timer 0 has expired. If the time has expired, program control advances to step S800, whereat an error process is performed. Program control thereafter returns to step S702. If the time has not expired, program control returns to step S794.

At step S802, a value of "0" is set to a PPS-Q re-transmission counter, and at step S804, a timing of 2.2 seconds is set for a timer (timer 0) for designating the retrain process. This period of time will be described later.

At step S806, the control circuit 20 is shifted for the processing of control channel data, and transmits a preamble signal at 100 mS. At step S808, a PPS-Q signal is transmitted as significant data for the control channel data, and at step S810, the timing for the timer T4 is set to three seconds as the period allocated for the reception of a response.

Following this, at step S812, a check is performed to determine whether a significant signal can be detected among the control channel data. If a significant signal is detected, program control advances to step S822, and if a significant signal is not detected, program control moves to step S814.

At step S814, a check is performed to determine whether the time set for the timer 0 has expired. When the time has expired, program control moves to step S840, whereat the retrain process is requested (this is the time at which the reception side does not transmit signals PPR, MCF and RNR, and at which the retrain process can be detected). When the time has not expired, program control returns to step S816.

At step S816, a check is performed to determine whether the time set for the T4 timer has expired. When the time has not expired, program control returns to step S812. When the time has expired, program control advances to step S818, whereat the count held by the re-transmission counter is incremented by one.

At step S820, a check is performed to determine whether a count held by the re-transmission counter is equal to three or greater. When the count is three or greater, program control advances to step S836, and when the count is less than three, program control returns to step S804.

At steps S822 and S824, a check is performed to respectively determine whether a PPR signal and a MCF signal have been detected. When a PPR signal has been detected, program control returns to step S790, and when an MCF signal has been detected, program control advances to step S826. If another signal is detected, program control moves to step S830.

At step S826, a check is performed to determine whether there is a subsequent page. If there is a subsequent page, program control returns to step S790, and if there are no more pages, program control advances to step S828, whereat a DCN signal is output. Program control thereafter returns to step S702.

At step S830, a check is performed to determine whether or not an RNR signal has been detected. If an RNR signal has been detected, program control advances to step S832, whereat an RR signal is transmitted. Program control thereafter returns to step S810. If an RNR signal has not been detected, program control moves to step S834, whereat an error process is performed. Program control thereafter returns to step S702.

In addition, transmission of a DCN signal at step S836 and an error process at step S838 are sequentially performed, and program control thereafter returns to step S702.

At step S840, the time held by the timer T4 is stored in a memory T4 SAV, and the counting of the timer T4 is halted. At step S842, the timing for the timer 0 is set to ten seconds as the period that will elapse before control channel data is detected. At step S844, an AC signal is transmitted to request the retrain process via the control channel.

At step S846, the reception of signals PPh, ALT, MPh and E, and the transmission of signals PPh, ALT, MPh and E are performed. When the E signal has been transmitted, transmission of a flag is executed.

At step S848 a check is performed to determine whether or not control channel data, which have been transmitted via the control channel from the partner's station, have been detected. When control channel data have been detected, program control advances to step S850, whereat the stored T4 SAV timing is set for the timer T4, and the counting by the timer T4 is begun. Program control thereafter returns to step S816. When control channel data have not been detected, program control moves to step S852.

At step S852, a check is performed to determine whether the time set for the timer 0 has expired. If the time has expired, program control advances to step S854, whereat an error process is performed. Program control thereafter returns to step S702. If the time has not expired, program control returns to step S846.

Figure 35:
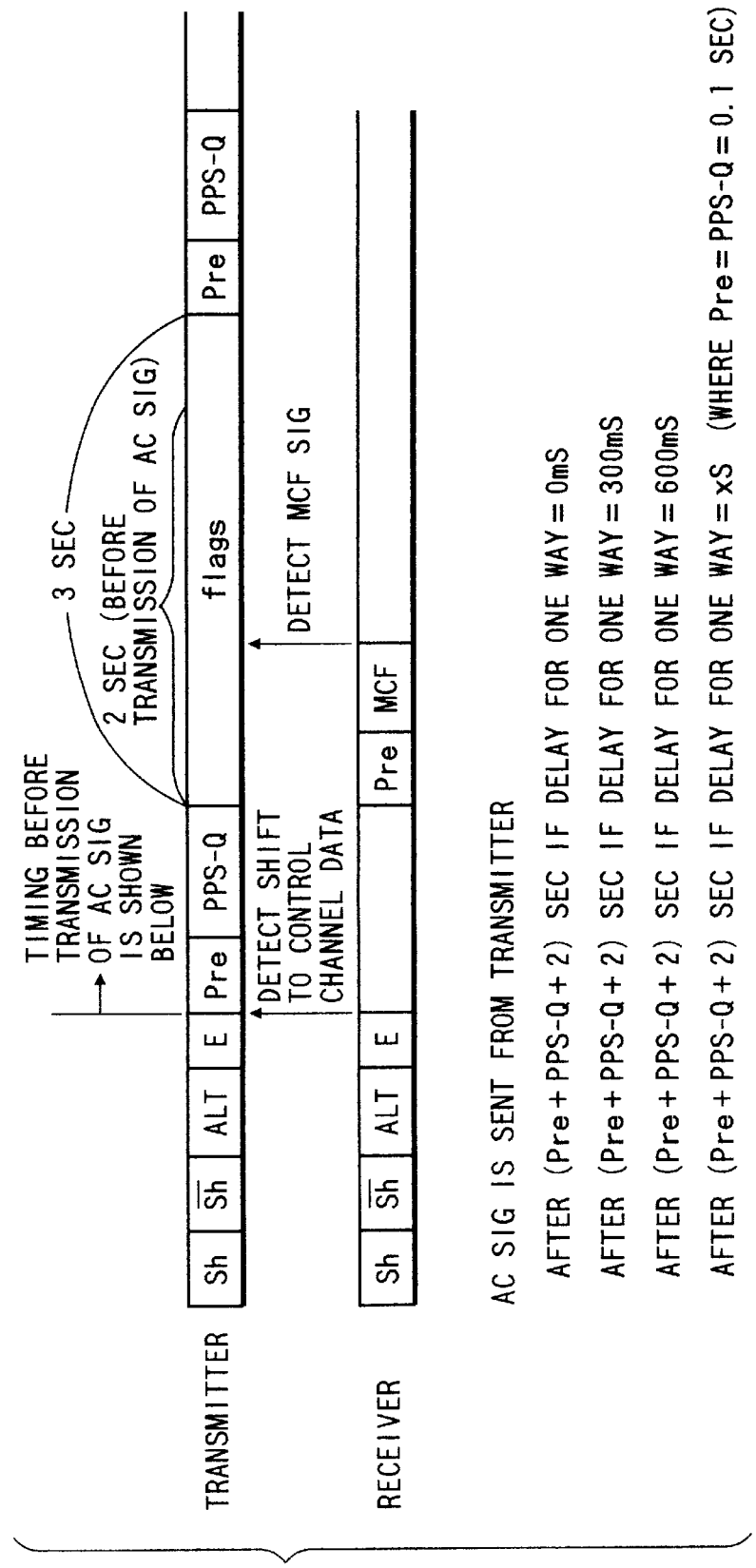
FIG. 35 is a diagram for explaining retrain signal transmission timing according to the sixth embodiment.

FIG. 35 is a diagram of the timing for an AC signal that is to be transmitted after the shifting of the control channel data has been detected during the response transmission following the dispatching of a PPS-Q signal by a transmitter.

In this case, a retrain request must be issued only when the data shifting can not be detected at the time the PPS-Q signal has been transmitted, and then the reception of an MCF signal is terminated. Therefore, assuming that an AC signal is transmitted two seconds later than the termination of the transmission of a PPS-Q signal, 2 seconds+0.1 second (preamble time)+0.1 second (PPS-Q transmission time)=2.2 seconds is required after the shifting to the control channel data is detected, and is constant, regardless of a line delay.

Figure 36:
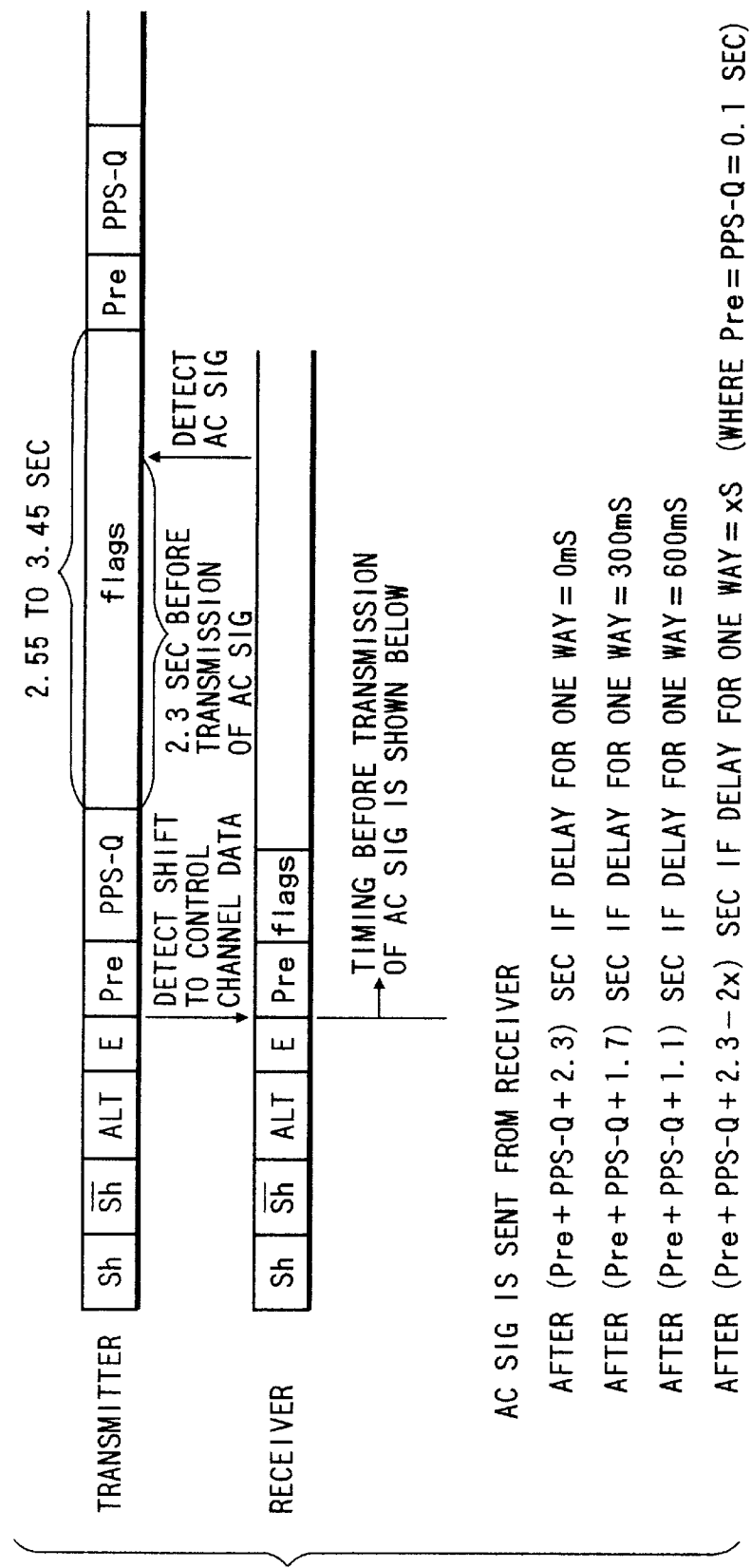
FIG. 36 is a diagram for explaining retrain signal transmission timing according to the sixth embodiment.

FIG. 36 is a diagram showing the timing for the transmission of an AC signal when the shifting to the control channel data is detected during the command reception after the primary channel data have been received from the receiver.

In this case, an AC signal must be transmitted at a timing where by it can be detected before the transmitter transmits the next PPS-Q signal.

Assume that a first PPS-Q signal has been transmitted by the transmitter with a delay of 0 mS, and the first AC signal is received three seconds later. The transmission timing for an AC signal, after the shifting to the control channel data has been detected during the command reception, is 2.3 seconds+0.1 second (preamble time)+0.1 second (PPS-Q reception time (this signal can not be received due to an error))=2.5 seconds.

With a delay time for a one-way transmission being x mS, x mS is required by the transmitter to detect the shifting to the control channel data, and x mS is required until an AC signal is transmitted by the receiver to the transmitter, so that the transmission timing for an AC signal is (2.5 seconds–2× seconds).

Therefore, when the retrain process is executed at the above obtained timing, effective data at the control channel are not destroyed by the retrain process and communications can be continued.

In the sixth embodiment, an explanation has been given by using the response reception after the PPS-Q signal has been transmitted, and the command reception following the primary channel data have been received. This embodiment may be used, in the same manner, for response reception and command reception at another timing.

In addition, in the sixth embodiment, the transmission/reception of signals Sh, Sh., ALT and E via the control channel have been explained; however, this embodiment can be employed for the transmission/reception of signals PPh, ALT, MPh and E.

A standalone facsimile machine has been employed for the individual embodiments, but the present invention is not limited to this type of facsimile machine, and can be employed, for example, for a host computer, a copy machine, a printer, and a system that constitutes a compound apparatus having an electronic filing function.

In addition to the above embodiments, various other modifications of the present invention can be employed.

What is claimed is:

1. A communication apparatus, for communicating via a control channel, comprising:

determination means for determining, in communication procedures, a direction in which a retrain signal is to be transmitted during communication via said control channel;

detection means for detecting a communication error at said control channel; and retrain signal communication means for transmitting or receiving said retrain signal in accordance with the determination at said determination means and the detection at said detection means.

2. A communication apparatus according to claim 1, wherein said determination means determines whether to transmit said retrain signal from a transmitter to a receiver or from said receiver to said transmitter.

3. A communication apparatus according to claim 1,
wherein said determination means performs a preprocess, so that a transmitter notifies a receiver of a capability for transmitting a retrain signal from said transmitter while communicating via said control channel and a capability of receiving a retrain signal from said receiver while communicating via said control channel, and
wherein said determination means performs a preprocess, so that said receiver notifies said transmitter regarding transmitting a retrain signal or receiving a retrain signal from said transmitter while communicating via said control channel.

4. A communication method comprising the steps of:
determining, through a pre-process, a direction in which a retrain signal is to be transmitted while communicating via a control channel; and
effecting a retrain process, as needed, while communicating via said control channel, in accordance with the determination.

5. A communication method according to claim 4, wherein transmission of said retrain signal while communicating via said control channel is either from a transmitter to a receiver or from said receiver to said transmitter.

6. A communication method according to claim 4,
wherein, in a pre-process, a transmitter notifies a receiver of a capability for transmitting a retrain signal from said transmitter while communicating via said control channel and a capability of receiving a retrain signal from said receiver while communicating via said control channel, and
wherein, in a pre-process, said receiver notifies said transmitter regarding transmitting a retrain signal or receiving a retrain signal from said transmitter while communicating via said control channel.

7. A communication apparatus comprising:
means for designating a retrain via a control channel;
means for detecting said retrain via said control channel; and
means for shifting to a control channel transmission/reception initial state when said retrain via said control channel is either designated or detected, and for halting communications when the number of designations of said retrain via said control channel, or the total of detections of said retrain via said control channel is equal to or greater than a predetermined value.

8. A communication apparatus according to claim 7, wherein, during response reception, when said retrain via said control channel is either designated or detected, a command signal re-transmission counter is cleared, an operating mode is shifted to transmission of control channel data, and a command signal is transmitted.

9. A communication apparatus according to claim 7, wherein, during command reception, when said retrain via said control channel is designated or when a retrain process control response is received via said control channel, a timer T2 is cleared when an operating mode is shifted to reception of said control channel data.

10. A communication method comprising the steps of:
designating a retrain via a control channel;
detecting said retrain via said control channel; and
shifting to a control channel transmission/reception initial state when said retrain via said control channel is either designated or detected, and halting communications when the number of designations of said retrain via said control channel, or the total of detections of said retrain via said control channel is equal to or greater than a predetermined value.

11. A communication method according to claim 10, wherein, during response reception, when said retrain via said control channel is either designated or detected, a command signal re-transmission counter is cleared, an operating mode is shifted to transmission of control channel data, and a command signal is transmitted.

12. A communication method according to claim 10, wherein, during command reception, when said retrain via said control channel is designated or when a retrain process control response is received via said control channel, a timer T2 is cleared when an operating mode is shifted to reception of said control channel data.

13. A communication apparatus comprising:
detection means for detecting a carrier of a signal via a control channel; and
means, when an operating mode is shifted to transmission of control channel data during transmission/reception via a control channel, for rendering OFF carrier detection which represents a detection of control channel data from a partner's apparatus, and for inhibiting a retrain.

14. A communication apparatus according to claim 13, further comprising means for designating a retrain when, during transmission/reception via said control channel, a procedure signal is not detected for a predetermined period of time or longer.

15. A communication apparatus according to claim 14, wherein said predetermined period of time is about 1.3 seconds.

16. A communication apparatus according to claim 13, further comprising means for performing a shift for reception of control channel data when the OFF state of said carrier detection is detected during reception of primary channel data.

17. A communication apparatus according to claim 16, wherein, upon initiation of said reception of said primary channel data, an ON state of said carrier detection must be confirmed within a first predetermined period, and wherein, once said ON state of said carrier detection has been detected, a shift to reception via said control channel is performed in response to the continuous ON state of said carrier detection for a second predetermined period of time or longer.

18. A communication apparatus according to claim 17, wherein said first predetermined period of time is approximately 1.3 seconds, and said second predetermined period of time is approximately 40 mS.

19. A communication method comprising the steps of:
detecting a carrier of a signal via a control channel; and
when an operating mode is shifted to transmission of control channel data during transmission/reception via a control channel, rendering OFF carrier detection signal, which represents detection of control channel data from a partner's apparatus, and inhibiting a retrain.

20. A communication method according to claim 19, further comprising the step of designating a retrain when, during transmission/reception via said control channel, a procedure signal is not detected for a predetermined period of time or longer.

21. A communication method according to claim 20, wherein said predetermined period of time is about 1.3 seconds.

22. A communication method according to claim 19, further comprising the step of performing a shift for reception of control channel data when the OFF state of said carrier detection is detected during reception of primary channel data.

23. A communication method according to claim 22, wherein, upon initiation of said reception of said primary channel data, an ON state of said carrier detection is to be confirmed within a first predetermined period, and wherein, once said ON state of said carrier detection has been detected, a shift to reception via said control channel is performed in response to the continuous ON state of said carrier detection for a second predetermined period of time or longer.

24. A communication method according to claim 23, wherein said first predetermined period of time is approximately 1.3 seconds, and said second predetermined period of time is approximately 40 mS.

25. A communication apparatus comprising:
means for designating a retrain via a control channel;
means for detecting said retrain via said control channel; and
means for designating said retrain, so that said retrain performed via said control channel is detected when a partner's apparatus does not transmit significant data via said control channel.

26. A communication apparatus according to claim 25, wherein the designation of said retrain upon the receipt of a response is performed a predetermined time after initiation of a transmission of said control channel data via said control channel, and wherein, for designation of said retrain upon the receipt of a command, after said retrain is detected and a shift to reception of said control channel data is performed, the time that elapses for designating said retrain via said control channel is changed based on a line delay.

27. A communication apparatus according to claim 26, wherein the designation of said retrain upon the receipt of a response is performed 2.2 seconds after initiation of a transmission of said control channel data via said control channel.

28. A communication apparatus according to claim 26, wherein, assuming that a line delay for one-way transmission is td, said retrain upon the receipt of a command, after a shift to reception of said control channel data is performed, is designated following the elapse of the time obtained by subtracting 2td from 2.5 seconds.

29. A communication method comprising the steps of:
designating a retrain via a control channel;
detecting said retrain via said control channel; and
designating said retrain, so that said retrain performed via said control channel is detected when a partner's apparatus does not transmit significant data via said control channel.

30. A communication method according to claim 29, wherein the designation of said retrain upon the receipt of a response is performed a predetermined time after initiation of a transmission of said control channel data via said control channel, and wherein, for designation of said retrain upon the receipt of a command, after a shift to reception of said control channel data is performed, the time that elapses for designating said retrain at said control channel is changed based on a line delay.

31. A communication method according to claim 30, wherein the designation of said retrain upon the receipt of a response is performed 2.2 seconds after initiation of a transmission of said control channel data via said control channel.

32. A communication method according to claim 30, wherein, assuming that a line delay for one-way transmission is td, said retrain upon the receipt of a command, after a shift to reception of said control channel data is performed, is designated following the expiration of the time obtained by subtracting 2td from 2.5 seconds.

* * * * *